United States Patent
Dzeryn et al.

(10) Patent No.: US 10,747,467 B2
(45) Date of Patent: Aug. 18, 2020

(54) MEMORY MANAGEMENT FOR APPLICATION LOADING

(71) Applicant: Apple Inc., Cupertino, CA (US)

(72) Inventors: Antony J. Dzeryn, Mountain View, CA (US); Michael J. Lamb, San Jose, CA (US); Neil G. Crane, San Francisco, CA (US); Brent W. Schorsch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/179,877

(22) Filed: Jun. 10, 2016

(65) Prior Publication Data

US 2017/0357465 A1  Dec. 14, 2017

(51) Int. Cl.
  *G06F 3/06* (2006.01)
  *G06F 9/48* (2006.01)

(52) U.S. Cl.
  CPC .......... *G06F 3/0653* (2013.01); *G06F 3/0604* (2013.01); *G06F 3/0647* (2013.01);
  (Continued)

(58) Field of Classification Search
  CPC .... G06F 3/0653; G06F 3/0604; G06F 3/0647; G06F 3/0673
  See application file for complete search history.

(56) References Cited

U.S. PATENT DOCUMENTS

| | | |
|---|---|---|
| 8,933,952 B2 | 1/2015 | Zaman et al. |
| 9,060,196 B2 | 6/2015 | Torr et al. |

(Continued)

FOREIGN PATENT DOCUMENTS

| | | |
|---|---|---|
| CN | 102171940 A | 8/2011 |
| EP | 2332266 A2 | 6/2011 |

(Continued)

OTHER PUBLICATIONS

Whitwam, [Lollipop Feature Spotlight] The Recent Apps List now Persists through Reboot, Android Police, Oct. 17, 2004 [retreived from Internet Sep. 8, 2017][<URL: http://www.androidpolice.com/2014/10/17/lollipop-feature-spotlight-the-recent-apps-list-now-persists-through-reboot/>].*

(Continued)

*Primary Examiner* — David Yi
*Assistant Examiner* — Nicholas A. Paperno
(74) *Attorney, Agent, or Firm* — Kilpatrick Townsend & Stockton LLP

(57) ABSTRACT

Some embodiments can load one or more applications into working memory from persistent storage when permitted by a memory pressure level of a mobile device. Loading the applications into working memory enables the applications to be launched into the foreground quickly when the user indicates the desire to launch. Some embodiments may identify a set of applications that are designated for providing snapshots to be displayed when the mobile device is in a dock mode. Certain embodiments may determine a current memory pressure level. Some embodiments may load an application in the set of applications into working memory from a persistent storage responsive to determining that the memory pressure level is below a threshold. Certain embodiments may continue to load additional applications responsive to determining that the memory pressure level is below the threshold. After determining that the memory pressure level is above the threshold, some embodiments may reclaim memory.

17 Claims, 10 Drawing Sheets

(52) U.S. Cl.
CPC ............ *G06F 3/0673* (2013.01); *G06F 9/485* (2013.01); *G06F 2209/5019* (2013.01)

(56) References Cited

U.S. PATENT DOCUMENTS

| | | | |
|---|---|---|---|
| 9,367,211 | B1 | 6/2016 | Turner |
| 9,916,075 | B2* | 3/2018 | Chen ..................... G06F 17/214 |
| 9,918,664 | B2* | 3/2018 | Blahnik ................ A61B 5/1112 |
| 9,974,467 | B2* | 5/2018 | Blahnik ................ A61B 5/1112 |
| 2006/0123353 | A1 | 6/2006 | Matthews et al. |
| 2008/0005736 | A1 | 1/2008 | Apacible et al. |
| 2010/0088598 | A1 | 4/2010 | Lee et al. |
| 2011/0138295 | A1 | 6/2011 | Momchilov et al. |
| 2011/0306304 | A1 | 12/2011 | Forutanpour et al. |
| 2011/0317195 | A1 | 12/2011 | Mitsui et al. |
| 2012/0210266 | A1 | 8/2012 | Jiang et al. |
| 2012/0290657 | A1 | 11/2012 | Parks et al. |
| 2012/0297304 | A1* | 11/2012 | Maxwell ........... H04M 1/72569 715/728 |
| 2012/0324481 | A1 | 12/2012 | Xia et al. |
| 2013/0024812 | A1 | 1/2013 | Reeves et al. |
| 2014/0013271 | A1 | 1/2014 | Moore et al. |
| 2014/0245461 | A1 | 8/2014 | O'neill et al. |
| 2014/0258238 | A1 | 9/2014 | Jin et al. |
| 2014/0280580 | A1 | 9/2014 | Langlois et al. |
| 2014/0372356 | A1 | 12/2014 | Bilal et al. |
| 2014/0378159 | A1 | 12/2014 | Dolbakian et al. |
| 2015/0134602 | A1* | 5/2015 | Nicholas ................ G06F 16/23 707/609 |
| 2015/0324137 | A1* | 11/2015 | Wu ....................... G06F 3/0619 713/2 |
| 2015/0347204 | A1 | 12/2015 | Stanley-Marbell et al. |
| 2016/0092275 | A1 | 3/2016 | Booman et al. |
| 2017/0126610 | A1 | 5/2017 | Sachidanandam |
| 2017/0285894 | A1 | 10/2017 | Barrus et al. |

FOREIGN PATENT DOCUMENTS

| | | |
|---|---|---|
| TW | 201232400 | 8/2012 |
| WO | 2010038985 A2 | 4/2010 |

OTHER PUBLICATIONS

Cozma, How recent aps work on Android 5.0 Lollipop, clnet, Nov. 4, 2014 [retrieved form internet Sep. 8, 2017][<URL: https://www.cnet.com/how-to/how-recent-apps-work-on-android-5-0-lollipop/>].*

Bertoncin, When does Android take its recent apps switcher sceenshot?, Stack Overflow, Jun. 23, 2015 [retrieved from internet Sep. 7, 2017][<URL: https://stackoverflow.com/questions/31011593/whendoesandroidtakeitsrecentappsswitcherscreenshot>].*

Chris Hall, Watch complications: What is Apple talking about?, Pocket-Lint.com, Sep. 2015 [retrieved from internet Aug. 13, 2018][<URL:https://www.pocket-lint.com/smartwatches/news/apple/135377-watch-complications-what-is-apple-talking-about>] (Year: 2015).*

Elizabeth Stinson, Google Just Made Its Smartwatch Faces Actually Useful, Wired.com, Aug. 2015 [retrieved from internet Aug. 13, 2018][<URL:https://www.wired.com/2015/08/google-just-made-smartwatch-faces-actually-useful/>] (Year: 2015).*

PCT/US2017/034506, "International Search Report and Written Opinion," dated Aug. 24, 2017, 17 pages.

Qiu et al., "Towards Power-Efficient Smartphones by Energy-Aware Dynamic Task Scheduling," IEEE 14th International Conference on High Performance Computing and Communications, 2012, pp. 1466-1472.

Yan et al., "Fast App Launching for Mobile Devices Using Predictive User Context," Jun. 25-29, 2012, 14 pages.

U.S. Appl. No. 15/179,824, Final Office Action, dated Sep. 28, 2018, 43 pages.

U.S. Appl. No. 15/179,863, Final Office Action, dated Dec. 13, 2018, 21 pages.

Budiu, "Smartwatches are the Future—But Samsung Galaxy Gear Only Partway There", nngroup.com, Available at URL https://www.nngroup.com/articles/samsung-watch, Dec. 8, 2013, 15 pages.

Dobie, "Android N's Recent Apps Key Has Grown a Bunch of Awesome New Features", androidcentral.com, Available at URL https://www.androidcentral.com/android-n-recents-menu-makes-super-easy-hop-between-apps, Mar. 9, 2016, 3 pages.

Non-Final Office Action issued in U.S. Appl. No. 15/179,863, dated Jun. 27, 2019 in 17 pages.

First Examination Report issued in Australia Application No. AU2017277697, dated May 20, 2019 in 2 pages.

Notice of Allowance issued in U.S. Appl. No. 15/179,824, dated Aug. 26, 2019 in 8 pages.

"Examination Report No. 2 for Standard Patent Application," dated Dec. 19, 2019 in Australian Patent Application No. 2017277697. 3 pages.

Notice of Preliminary Rejection dated Jan. 2, 2020 in Korean Patent Application No. 10-2018-7034647. 13 pages (includes English translation).

* cited by examiner

MEMORY MANAGEMENT FOR APPLICATION LOADING

CROSS-REFERENCES TO RELATED APPLICATIONS

The present application is related to commonly-owned co-pending U.S. application Ser. No. 15/179,863, directed to "PROVIDING UPDATED APPLICATION DATA FOR PREVIEWING APPLICATIONS ON A DISPLAY", filed on Jun. 10, 2016, and commonly-owned co-pending U.S. application Ser. No. 15/179,824, directed to "ENHANCED APPLICATION PREVIEW MODE", filed on Jun. 10, 2016, which are incorporated by reference in their entirety for all purposes.

BACKGROUND

The present disclosure relates generally to mobile devices, and in particular to memory management for mobile devices.

Mobile devices can display recent application data for various applications. For example, a mobile device such as a wearable may display application data on the face of the mobile device where the application data needs to be refreshed as frequently as possible. Significant load time may be required for updating application data as the data expires. User experience is diminished quickly as the user spends more time waiting for the application to load and update the data for display. Further, keeping all the applications active where application data is constantly updated for display would not only take up too much memory where memory is limited, but would also drain the battery life and stall other processes on the mobile device.

BRIEF SUMMARY

Some embodiments can load one or more applications into a memory of a mobile device based on memory availability where the applications are from a predetermined list of applications. The predetermined list of applications can be applications designated for display in a preview mode (also referred to as an application dock) where snapshots of the applications may be displayed to a user. Some embodiments may determine a memory pressure level corresponding to an amount of free memory available on the mobile device. Responsive to determining the memory pressure level, the device may determine whether to load an application. If the memory pressure level is below a threshold, then the device may determine to load the application into memory from persistent storage. After a preset time interval, the device may make another determination as to the memory pressure level. If the memory pressure level is below the threshold, then the device may determine to load another application. The device may continue to determine if the memory pressure level is below the threshold and load applications in the predetermined list of applications until all the applications in the predetermined list are loaded. If the memory pressure level exceeds the threshold, then the device may stop loading or de-load one or more applications.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Some embodiments can load one or more applications into a memory of a mobile device based on memory availability where the applications are from a predetermined list of applications. In some embodiments, the predetermined list of applications can be applications designated for an application dock where snapshots of the applications may be displayed to a user when the mobile device is in a preview mode.

Some embodiments may determine a memory pressure level corresponding to the amount of free memory available on the mobile device. After determining the memory pressure level, the device may determine whether to load (also referred to as pre-launch) an application. If the memory pressure level is below a threshold, then the device may determine to load the application into memory from persistent storage. After a preset time interval, the device may make another determination as to the memory pressure level. If the memory pressure level is below the threshold, then the device may determine to load another application. The device may continue to determine if the memory pressure level is below the threshold and load applications in the predetermined list of applications until all the applications in the predetermined list are loaded. If the memory pressure level exceeds the threshold, then the device may stop loading applications.

In certain embodiments, the device may de-load one or more of the applications in the predetermined set of applications if the memory pressure level exceeds a threshold level. In some embodiments, the applications that are designated for the dock, designated for complications, designated as "protected" may have higher priority than idle daemons. When the memory pressure level exceeds the threshold level (e.g., a foreground application is using too much memory), some embodiments may begin de-loading applications and/or processes (e.g., idle daemons) from memory, starting from the applications and/or processes with the lowest priorities.

Some embodiments may determine a memory pressure level and whether applications in the predetermined set of applications can be loaded when memory is freed (e.g., when a screen of the mobile device goes off). As memory pressure level permits, certain embodiments may load applications into working memory and generate snapshots including updated application data for the various applications. The snapshots with updated application data may then be displayed to a user as the user is browsing snapshots in the dock. The user may cause an application to be launched into the foreground of the mobile device by selecting a snapshot that corresponds to the application (e.g., by tapping the snapshot).

I. Memory Management System Overview

Figure 1:
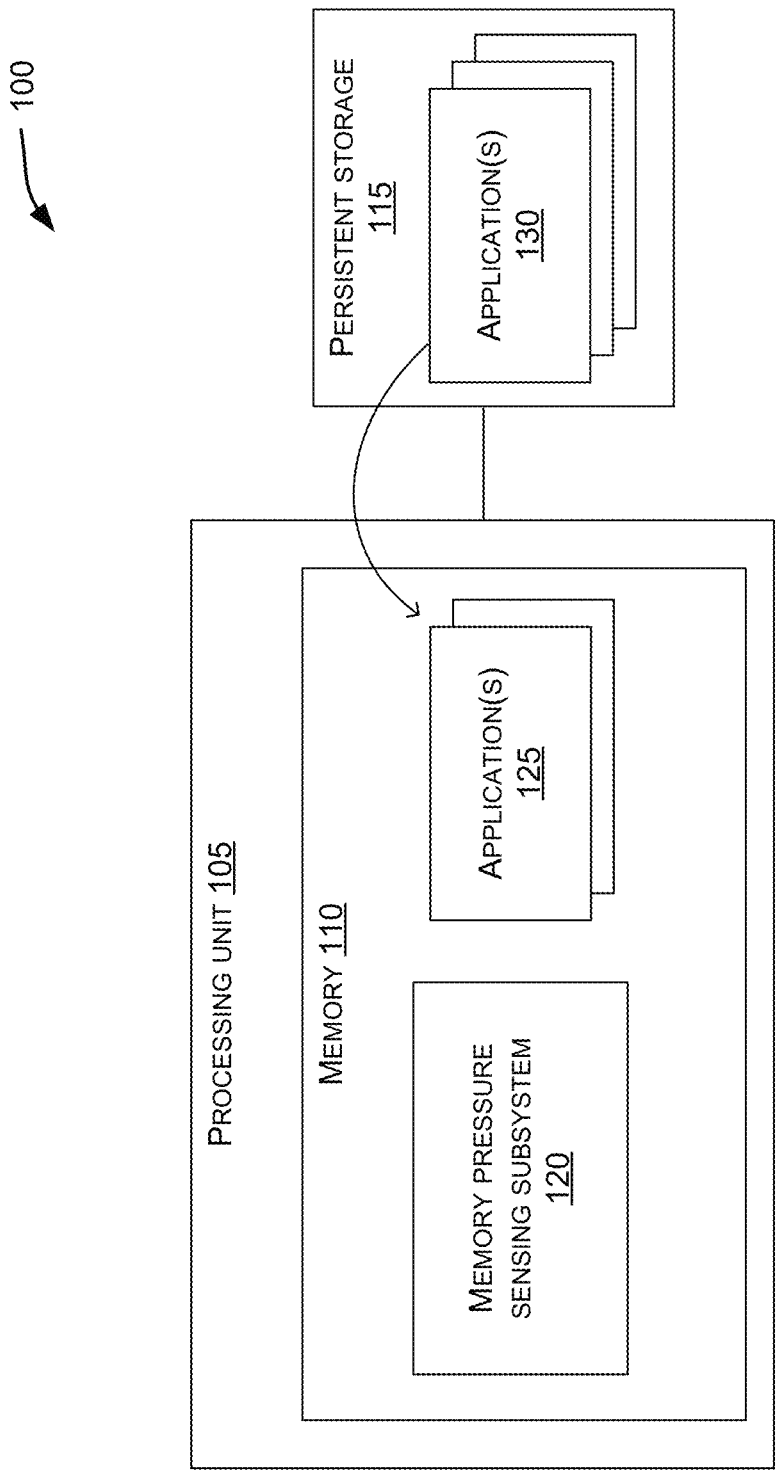
FIG. 1 depicts a high level block diagram of a memory management system for loading of applications from persistent storage into memory of a mobile device according to certain embodiments.

FIG. 1 depicts a high level block diagram of a memory management system 100 for loading of applications from persistent storage into memory of a mobile device according to certain embodiments. Some embodiments may load applications from persistent storage into memory not to launch the applications (e.g., into the foreground) where they are actively running, but to have them in a pre-launched state. In some embodiments, when an application is pre-launched, the application is loaded and resident in memory, but not presented to a user in the foreground where the user can interact with the application. In certain embodiments, the application may be launched into the foreground more quickly when the application has been pre-launched and is resident in memory than if the application had to be loaded from persistent storage into memory when a user tries to activate the application (e.g., by tapping on a snapshot).

In some embodiments, memory management system 100 includes a processing unit 105 and a persistent storage 115. Processing unit 105 can include memory 110 and one or more processors (e.g., central processing units) (not shown here) that can execute computer code to perform one or more processes. Memory 110 can include one or more applications 125 and memory pressure sensing subsystem 120. Application(s) 125 can be one or more computer software applications that can perform tasks or functions, and may be part of the operating system.

In some embodiments, memory pressure sensing subsystem 120 can be software running on processing unit 105 that is resident in memory 110 and that can be accessed by one or more processors of processing unit 105. Memory pressure sensing subsystem 120 can determine information about memory 110, such as the available storage space on memory 110. In other embodiments, memory pressure sensing subsystem 120 can be a memory controller that provides information about the memory.

Applications 130 are shown as stored on a persistent storage 115. One or more of applications 130 can be loaded from persistent storage 115 of a mobile device into memory 110. In certain embodiments, persistent storage 115 can be a data storage device such as non-volatile storage that can retain data after the device is no longer powered. In some embodiments, persistent storage 115 can be on a same mobile device (e.g., a wearable device) as where memory 110 is residing. In other embodiments, memory 110 can be residing on a mobile device (e.g., a wearable device such as a smart watch) while persistent storage 115 can be on another mobile device (e.g., a smart phone). One or more applications 130 on persistent storage 115 of the other mobile device can be accessible by the mobile device, for example, through a network (e.g., Bluetooth®, WiFi®).

One or more of applications 130 can be loaded from persistent storage 115 to memory 110 when memory pressure sensing subsystem 120 determines that a "memory pressure" of memory 110 is below a threshold level. The loading of applications can be performed by processing unit 105. After loading an application 130 from persistent storage 115, application 125 can be resident in memory 110 and easily accessible by a mobile device upon which memory 110 resides.

A memory pressure level can be a measure of memory availability where a high memory pressure level can indicate that the amount of available memory is less than a predetermined value (e.g., 10 MB) or that the amount of available memory relative to the total amount is less than a threshold (e.g., less than 10% of total memory). In some embodiments, a low memory pressure level can indicate that the amount of or percentage of free memory (e.g., usable memory) is greater than a threshold amount or percentage (e.g., configurable by a system administrator or a user of the mobile device).

Some embodiments may desire to load all the applications that are part of an application dock for displaying in a preview mode. Applications that are part of an application dock may have a preview of the application presented to the user when the mobile device is in a preview mode. In certain embodiments, the preview of the application includes updated application data. Updated application data can be recent application data that is updated as current application data expires or application data that is periodically updated.

In some embodiments, there is only a subset of all the applications accessible via the mobile device (i.e. less than all the applications available on the mobile device) that are designated to be a part of the application dock. When the preview mode is activated (e.g., via the user selecting a button on the mobile device), the user may browse and navigate among the previews (also referred to as snapshots) presented in the application dock and select one of the previews to launch the application corresponding to the selected preview.

II. Example Screenshot

Some embodiments may load applications into memory even when the applications are not needed in the foreground (e.g., not yet requested by a user to be launched) in order to provide application snapshots when a mobile device is in a preview mode. In some embodiments, the snapshots may include updated application data. When applications are loaded into memory such as that described in FIG. 1, embodiments may generate snapshots for the applications resident in memory.

In some embodiments, prior to an application being launched (e.g., into the foreground of a screen of a mobile device), some embodiments can generate a snapshot for the application when the application has been loaded into memory but is not yet active. Certain embodiments may display these snapshots for applications when a mobile device is in a preview mode and allow a user to select a snapshot to activate the corresponding application. An example of the preview mode activated on a mobile device can be shown in FIG. 2.

Figure 2:
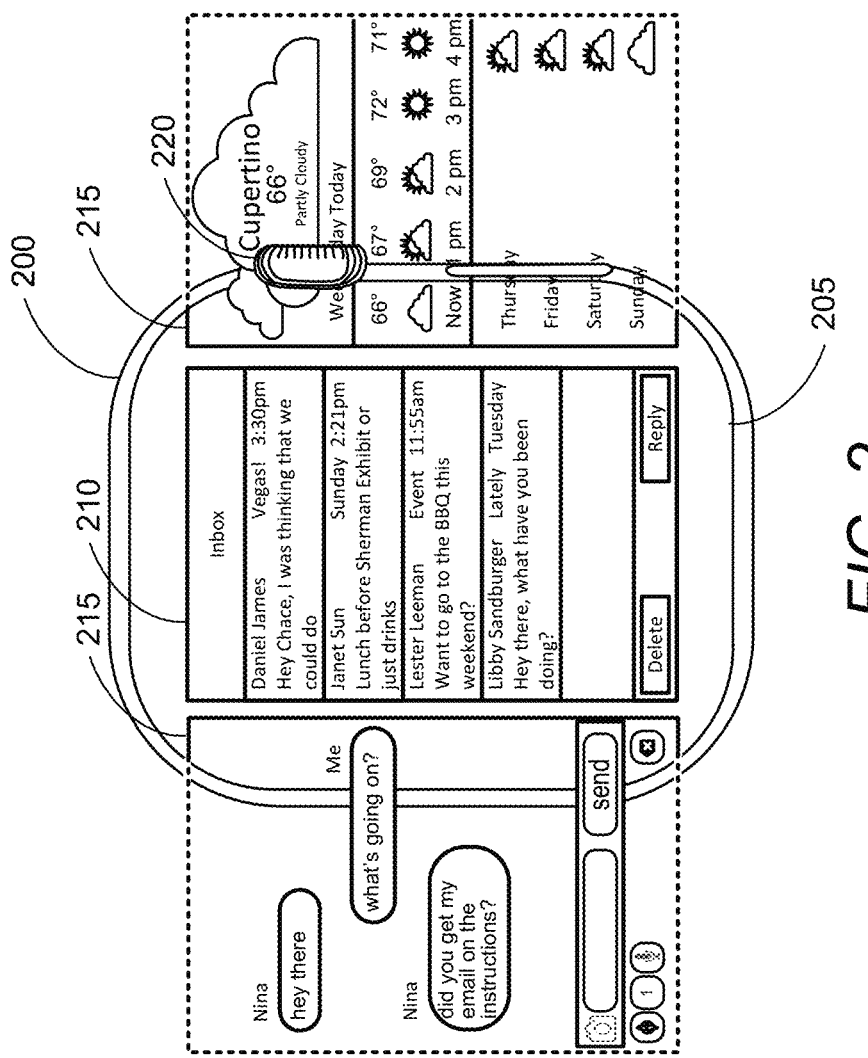
FIG. 2 illustrates an example of application snapshots being displayed on a mobile device while the preview mode is activated in accordance with some embodiments.

FIG. 2 illustrates an example of application snapshots being displayed on a mobile device 200 while the preview mode is activated in accordance with some embodiments. In preview mode, a graphical user interface 205 of mobile device 200 may display one or more application snapshots 210 and portions of additional snapshots 215 to indicate to the user that there are more application snapshots neighboring the full application snapshot(s) 210 being displayed, and that the user may navigate to those snapshots (e.g., by swiping the screen with her finger, by tilting the mobile device, by performing a gesture, by turning digital crown 220).

In this FIG. 2 there is a single full application snapshot 210 displayed in the center of graphical user interface 205 and portions of application snapshots 215 displayed adjacent to snapshot 210. When a user browses the dock and navigates to those neighboring snapshots 215, the user may then view on graphical user interface 205 the portions of the application snapshots that are currently dotted out. The portions of the snapshots that are dotted out indicate that the user may not see those portions while the interface 205 is centered on application snapshot 210. Different embodiments may accommodate different numbers and portions of applications on a screen differently.

Certain embodiments enable the presentation of updated snapshots of applications in a dock of applications while in preview mode. When applications are resident in memory, the applications may generate snapshots that include updated application data. However, such applications showing snapshots have not been launched into the foreground. The applications being resident in memory allows the snapshots of these applications to be generated and displayed in the preview mode, while not requiring the applications to be fully launched. If the application has not yet been fully launched, not all of its processes are loaded and actively running and hence ready for user interaction. The snapshots in the dock are updated according to various processes that can be found in U.S. Non-Provisional application Ser. No. 15/179,863, entitled "Providing Updated Application Data For Previewing Applications On A Display" and filed on Jun. 10, 2016, which is hereby incorporated by reference for all purposes.

III. Snapshot Generation System

Figure 3:
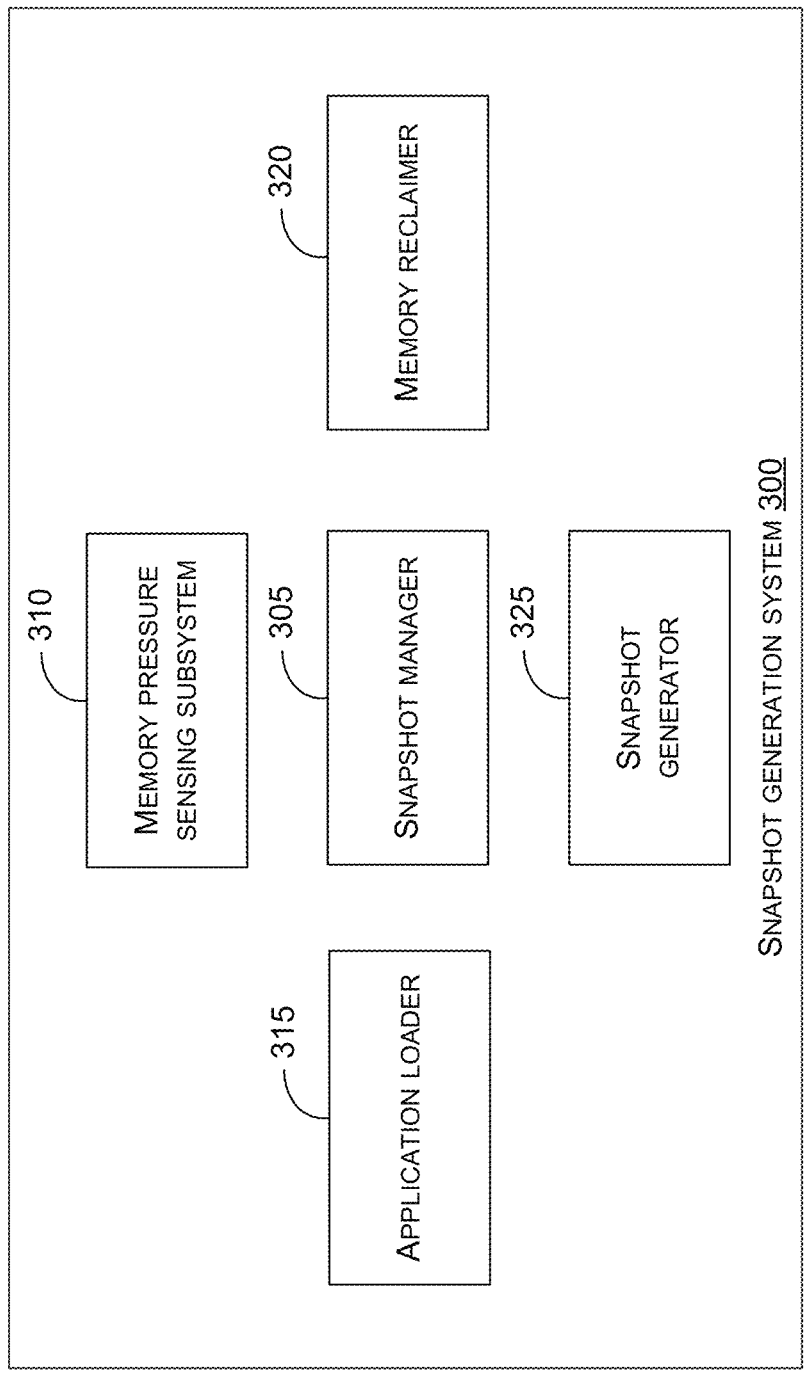
FIG. 3 illustrates an example snapshot generation system according to certain embodiments.

FIG. 3 illustrates an example snapshot generation system 300 according to certain embodiments. Certain embodiments may load one or more applications into memory to generate snapshots to display when a mobile device is in a preview mode. Some embodiments may identify the applications designated for the dock and load the applications into memory as the memory pressure permits. In some embodiments, snapshot generation system 300 can include a snapshot manager 305, a memory pressure sensing subsystem 310, an application loader 315, a memory reclaimer 320, and a snapshot generator 325. Snapshot generation system 300 may be software, hardware, or a combination thereof residing on the mobile device. Different embodiments may include additional or fewer modules as those described in FIG. 3. Further, certain components in snapshot generation system 300 may reside on another mobile device (e.g., a smart phone) that is communicatively coupled to the mobile device (e.g., a smart watch).

Snapshot manager 305 can manage the generation of application snapshots. In some embodiments, snapshot manager 305 can identify a set of applications that are designated for the application dock. Snapshot manager 305 can determine which applications are loaded into memory and which applications in the set are not loaded into memory. Snapshot manager 305 can load the applications in the set that have not been loaded into memory or send a request to application loader 315 to load the applications. Snapshot manager 305 can determine which applications to load into memory and the order (e.g., by priority level, based on placement of application snapshots in the dock) and manner (e.g., by round robin) in which the applications are loaded.

In some embodiments, snapshot manager 305 can also determine if the application snapshots in the application dock are up-to-date or need to be updated. Based on which applications are in memory, snapshot manager 305 can coordinate with the applications in generating and displaying the snapshots. For example, if an application is not in memory and the application's data needs to be updated, snapshot manager 305 can determine that the application needs to be loaded into memory in order to obtain the updated application data. In some embodiments, snapshot manager 305 may also determine if additional memory is needed to enable the loading of additional applications. If snapshot manager 305 determines that additional memory availability is needed, snapshot manager 305 may request memory reclaimer 320 to reclaim a certain amount of memory. Snapshot manager 305 may thereby load the additional applications once the memory is freed up and thereby facilitate the generation of the snapshots for the additional applications.

Memory pressure sensing subsystem 310 can determine a memory pressure level of a memory of a mobile device. In some embodiments, the memory pressure level can indicate the available memory space on the memory. In various embodiments, the memory pressure level can be an amount of memory (e.g., 10 Gb) available on the memory, a percentage amount of either the full capacity of the memory, or a total amount of the memory available set aside for applications and/or other processes (e.g., 80% of the full capacity) that is currently available. When the memory pressure level is low, there is more available space to load additional applications into memory. When the memory pressure level is beyond a threshold level, certain embodiments may determine that no more applications can be loaded into the memory.

In certain embodiments, snapshot manager 305 may determine a memory pressure level by sending a request for a current memory pressure level to memory pressure sensing subsystem 310. Memory pressure sensing subsystem 310 may then return the memory pressure level. Snapshot manager 305 may then determine whether the memory pressure level received from memory pressure sensing subsystem 310 is beyond a threshold level such that there is not sufficient capacity to load any additional applications. In some embodiments, snapshot manager 305 may determine that additional applications may be loaded because the memory pressure level is below the threshold level or a another threshold level may be used, e.g., one that is lower than the previously used threshold level.

Accordingly, memory pressure sensing subsystem 310 can interact with the memory of the mobile device. For example, memory pressure sensing subsystem 310 may communicate with memory (e.g., a cache in a processing unit of the mobile device). In some embodiments, memory pressure sensing subsystem 310 can be a memory controller that is programmable.

Application loader 315 can load one or more applications into memory from a persistent storage device, e.g., if such a function is not performed by snapshot manager 305. In some embodiments, snapshot manager 305 may send a request to application loader 315 to load one or more applications into memory, e.g., when a memory pressure level is below a threshold. After receiving the request to load an application, application loader 315 can load the application into working memory (e.g., cache or random access memory) of a mobile device.

Application loader 315 may load the components of the application into working memory such that the application is running (e.g., for a limited period of time) and updated without the interface of the application being displayed in the foreground. The application in this pre-launched state can be running in the background and quickly presented to the user in the foreground of the graphical interface when the user indicates that the user would like to view the contents of the application (e.g., by tapping on a corresponding snapshot displayed in the preview mode). Application launch time can appear to much shorter to a user when the application has been pre-launched than if the application had not been pre-launched. The launch time for the application can be measured as the time interval between the snapshot being tapped and when the application becomes available for user input, where the same screen of the snapshot is initially displayed to the user when the application is launched.

Memory reclaimer 320 can de-load or end one or more applications and/or processes in the memory to free up space in the memory. In some embodiments, memory reclaimer 320 can receive a request from snapshot manager 305 to free up space in the memory to load other applications and/or processes. In certain embodiments, memory reclaimer 320 can de-load one or more applications each time it receives a request. In some embodiments, memory reclaimer 320 can determine an amount of space that is needed to be freed after receiving a request from snapshot manager 305 and de-load application(s) and/or process(es) corresponding to the amount of space needed. One of ordinary skill in the art would recognize many way in which one or more applications and/or processes can be de-loaded.

In certain embodiments, memory reclaimer 320 can reclaim memory when the memory pressure level of the memory is beyond a threshold level. For example, memory reclaimer 320 may reclaim memory when a new snapshot for an application in the application dock is needed and when the application is not yet loaded into memory, and the memory pressure level is too high. In certain embodiments, memory reclaimer 320 can reclaim memory by identifying one or more applications and/or processes that are in a lower priority band and by discarding those applications and/or processes to free up memory.

Snapshot generator 325 can generate a snapshot of an application when the application is loaded into memory. In some embodiments, snapshot generator 325 may take a snapshot of a first screen of the loaded application. In certain embodiments, snapshot generator 325 may retrieve layer data (e.g., from persistent memory) and generate a snapshot by assembling the layer (e.g., based on a layer hierarchy). Snapshot generator 325 may generate one or more snapshots for application(s) when the application(s) are loaded into memory, but not actively running in the foreground.

Snapshot manager 305 may send a request to snapshot generator 325 to generate a snapshot when snapshot manager 305 has determined that a current snapshot of an application is outdated or includes expired data. Snapshot generator 325 may then generate an updated snapshot from the application in memory. The application may provide layer data in some embodiments and snapshot generator 325 (that may be part of the operating system) may create the snapshot using the layer data. Snapshot generator 325 may render the snapshot for display on the graphical user interface of the mobile device. In some embodiments, snapshot generator 325 may cause the snapshots to be displayed when a user is browsing a preview mode.

Figure 4:
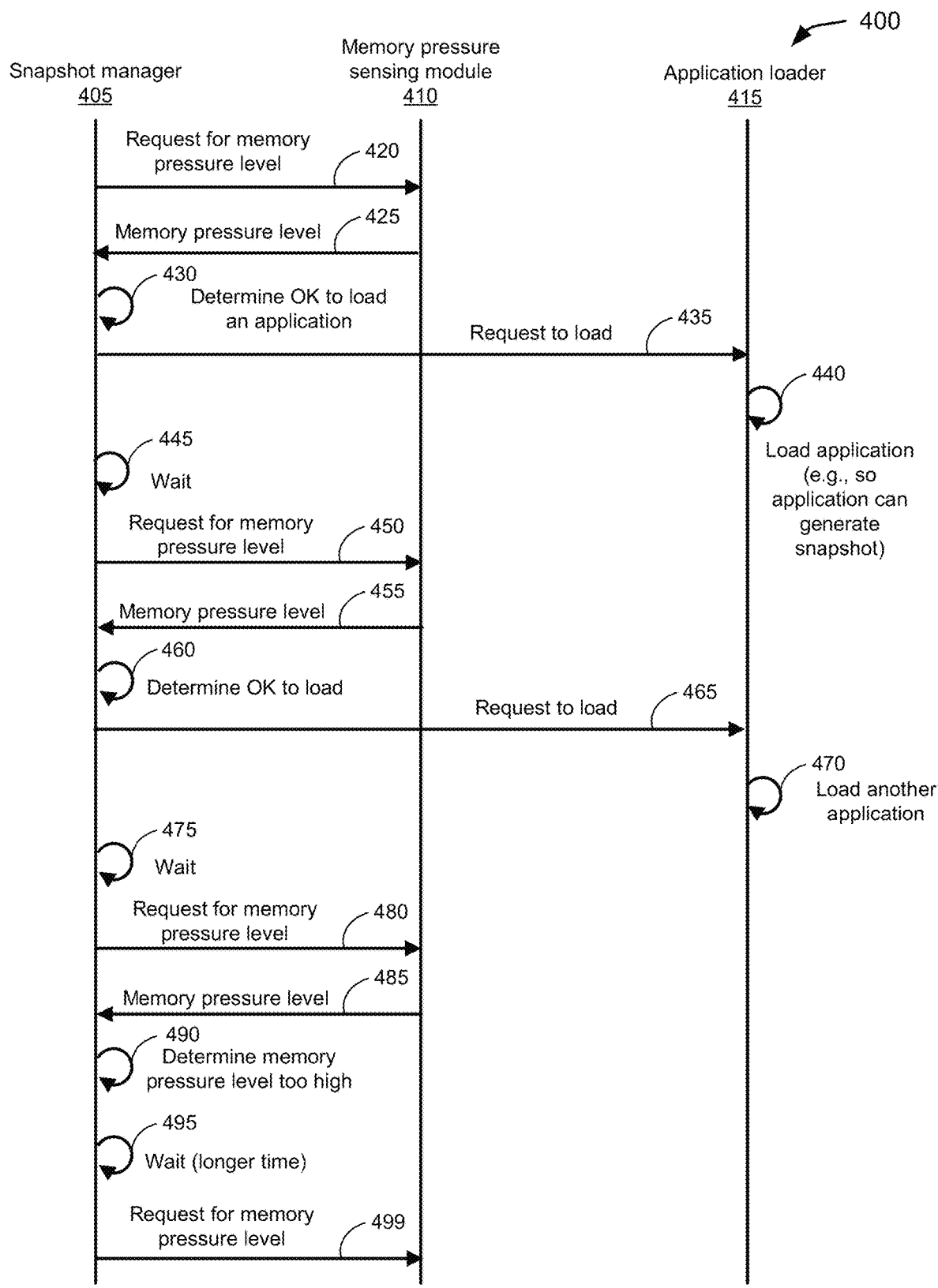
FIG. 4 illustrates an example sequence diagram of loading one or more applications into memory (also referred to as pre-launching) for applications in a dock in accordance with certain embodiments.

IV. Flow Overview for Loading Multiple Applications into Memory Based on Memory Usage A. Pre-Launching Applications as Memory Pressure is Below a Threshold FIG. 4 illustrates an example sequence diagram 400 of loading one or more applications into memory (also referred to as pre-launching) for applications in a dock in accordance with certain embodiments. Certain embodiments may load an application into memory when the application is part of a set of applications designated for the dock and is not yet loaded into memory. Some embodiments may load the application into memory (or pre-launch the application) so that a snapshot can be generated from the application and rendered on a mobile device for display during a preview mode.

Pre-launching the application can include loading the application content into the working memory of a computing device without displaying on a display of the computing device an interface associated with the application. In some embodiments, after an application is pre-launched, the application can provide the user a preview of application information via a snapshot. In certain embodiments, the snapshot of the application data can be kept updated so that the user gets a glimpse of updated application data when browsing through the dock in dock mode.

Sequence diagram 400 illustrates an example of the flow between interacting components including snapshot manager 405, memory pressure sensing module 410, and application loader 415. Snapshot manager 405 may be similar to snapshot manager 305 from FIG. 3 and may manage the loading of applications and generation of snapshots. Memory pressure sensing module 410 may be similar to memory pressure sensing subsystem 310 from FIG. 3 and may determine a memory pressure of memory on the mobile device by communicating with the memory. Application loader 415 may be similar to application loader 315 from FIG. 3 and may load one or more applications from persistent memory into working memory.

The components may be implemented in software, hardware (e.g., one or more processors), or a combination thereof. In certain embodiments, the software may be stored on a non-transitory computer-readable storage medium and executed by one or more processors. In some embodiments, snapshot manager 405, memory pressure sensing module 410, and application loader 415 may all be software running on a mobile device (e.g., a watch). In certain embodiments, some of these components may be run partially or fully by an external device (e.g., a smart phone).

At 420, snapshot manager 405 can send a request to memory pressure sensing module 410 for memory pressure level. At 425, responsive to receiving the request for memory pressure level, memory pressure sensing module 410 can determine the memory pressure level and send the determined level to snapshot manager 405.

At 430, snapshot manager 405 can determine whether to load one or more applications based on the received memory pressure level. In some embodiments, snapshot manager 405 may compare the receive memory pressure level to a threshold value (e.g., pre-configured by a system administrator or a user) in making the determination. In certain embodiments, after determining that the received memory pressure level is below a threshold value, snapshot manager 405 may determine to load an application. The memory pressure level and the threshold value can represent a value or a percentage.

At 435, after determining to load an application, snapshot manager 405 may request to load an application. The request can be sent to application loader 415. At 440, application loader 415 may then load the application. In some embodiments, the application is loaded so that the application can generate a snapshot. In certain embodiments, the application may not successfully load. If the application fails to load successfully, application loader 415 may wait for a period of time before trying to load again.

In some embodiments, after snapshot manager 405 requests to load an application, at 445, snapshot manager 405 may wait for a time interval before requesting for the memory pressure level again. In certain embodiments, the application may be loaded within the time interval. Some embodiments may determine and set the time interval based on an average time to load an application into memory, and in some instances, for the application to generate a snapshot. Certain embodiments may wait for an additional time period (e.g., for intra-application time if the application were to crash when attempting to load) in addition to the time interval for the application to load (e.g., inter-application time).

At 450, snapshot manager 405 can send another request to memory pressure sensing module 410 for the memory pressure level at that time. Memory pressure sensing module 410 may determine the new memory pressure level and send the new memory pressure level to snapshot manager 405 at 455. After receiving the memory pressure level at 455, snapshot manager 405 may determine whether to load another application at 460. Based on the memory pressure level (e.g., being below a threshold level), snapshot manager 405 may again determine to load another application. In some embodiments, snapshot manager 405 may determine a next application in the set of applications designated for the dock to be loaded. In certain embodiments, application loader 415 may determine the next application to be loaded.

After determining to load another application at 460, snapshot manager 405 may send a request to load to application loader 415 at 465. Application loader 415 may then proceed to load another application into memory. In some embodiments, the other application may be determined based on an order of the applications that are to be loaded. The order can be based on an order in which the snapshots are presented in the application dock. For example, the order may be from left to right or right to left. In certain embodiments, the order may be based on a likelihood that a user may launch the application. The likelihood of the user launching an application may be determined based on historical data in which the user would interact with the various applications accessible via the mobile device. After loading the application, some embodiments may generate another snapshot for the application.

At 475, snapshot manager 405 may again wait for a predetermined amount of time before sending another request for the memory pressure level. Certain embodiments may wait for the application to be loaded before requesting the memory pressure level. In some embodiments, snapshot manager 405 waits for the time interval after sending a request to load the other application. Some embodiments wait for the time interval so that application loader 415 does not load anything else at the same time.

At 480, snapshot manager 405 may then request for memory pressure level with memory pressure sensing module 410. At 485, snapshot manager 405 may receive the memory pressure level determined by memory pressure sensing module 410. At 490, snapshot manager 405 can determine that the memory pressure level is too high, or beyond a threshold level. Responsive to determining that the memory pressure level is beyond the threshold level at 490, snapshot manager 405 may determine to wait for a period of time at 495.

In some embodiments, snapshot manager 405 may wait for some time and then check with memory pressure sensing module 410 to see if the memory pressure has decreased after some period of time. In certain embodiments, the wait time may be longer than the time interval for when snapshot manager 405 has determined to load another application. At 499, after waiting for a predetermined period of time, snapshot manager 405 may send another request for memory pressure level again. The process of loading additional applications if the memory pressure level is determined to be below a threshold level may then repeat.

Figure 5:
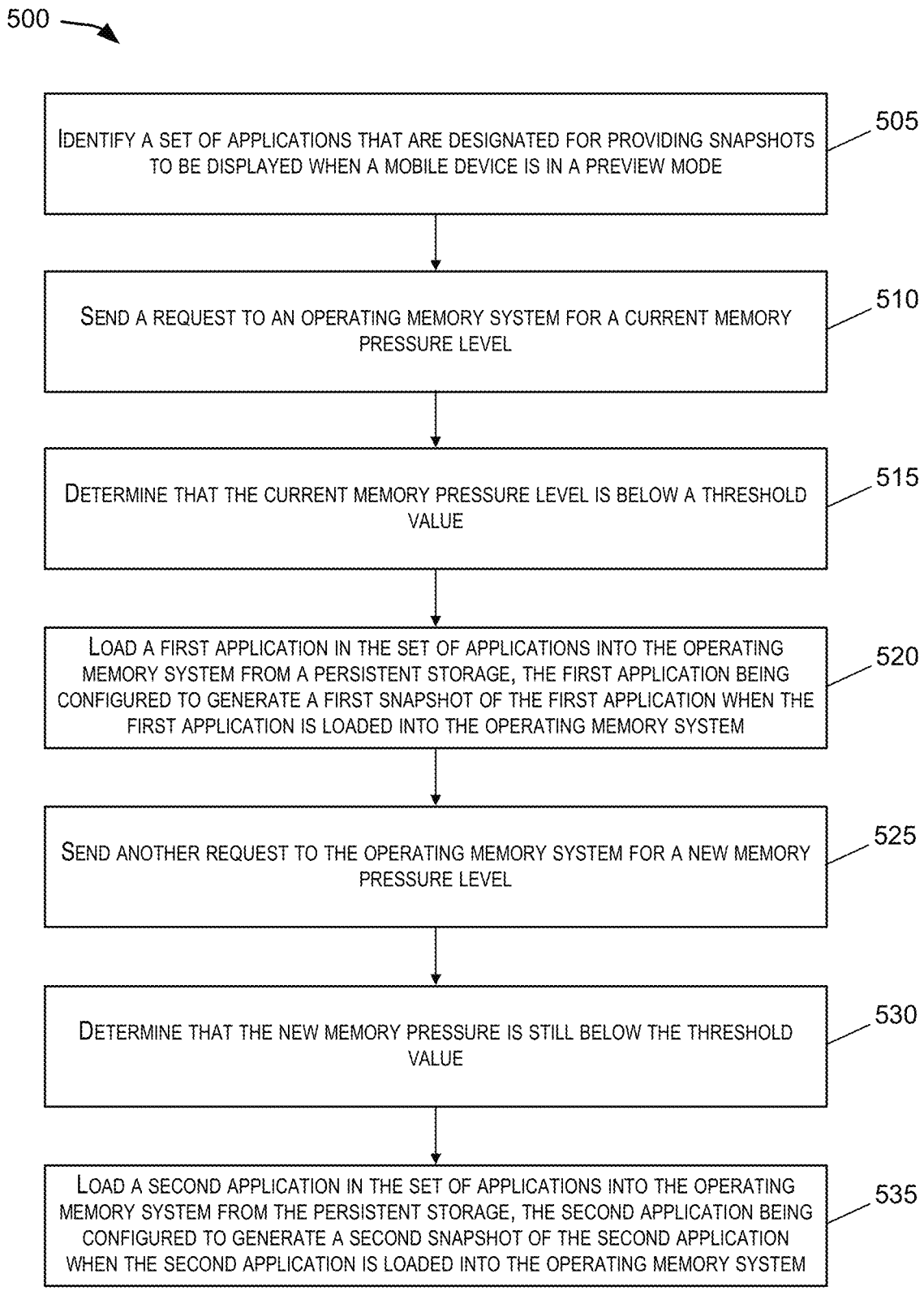
FIG. 5 illustrates an example process for loading multiple applications into operating memory from a persistent storage in accordance with certain embodiments.

B. Loading Multiple Applications and Generating Snapshots for Those Loaded Applications as Permitted by Memory Availability FIG. 5 illustrates an example process 500 for loading multiple applications into operating memory from a persistent storage in accordance with certain embodiments. Some embodiments may load an application into memory when a memory pressure level is below a threshold. Certain embodiments may determine to continue to load applications in a set of applications that are designated for the dock until all the applications in the set of applications are loaded into memory, if permitted by memory availability.

At block 505, process 500 can identify a set of applications that are designated for providing snapshots to be displayed when a mobile device is in a preview mode. Certain embodiments may determine which applications are part of the application dock. In some embodiments, the snapshots displayed in a preview mode when the mobile device is in the preview mode may need to be updated as application expires or becomes out-of-date. Some embodiments may attempt to load as many of the applications that are designated to be part of the application dock as permitted by the available memory.

At block 510, process 500 can send a request to a memory system for a current memory pressure level. In some embodiments, a snapshot manager (e.g., snapshot manager 305 from FIG. 3) may send a request to a memory pressure sensing subsystem (e.g., memory pressure sensing subsystem 310 from FIG. 3) for the current memory pressure level. Certain embodiments may load an application only when the memory pressure level is determined to be below a threshold level.

At block 515, process 500 can determine that the current memory pressure level is below a threshold value. In some embodiments, a memory pressure sensing subsystem may determine the current memory pressure level and send a response including the current memory pressure level to a snapshot manager. Snapshot manager may compare the current memory pressure level to a threshold value to determine whether the current memory pressure level is above or below the threshold value.

At block 520, process 500 can load a first application in the set of applications into the memory system from a persistent storage responsive to determining that the current memory pressure level is below the threshold. In some embodiments, the first application can be configured to generate a first snapshot of the first application when the first application is loaded into the memory system. In certain embodiments, a snapshot manager may load the application into working memory. In some embodiments, the snapshot manager may send a request to an application loader, such as application loader 315 from FIG. 3 to load the application.

In certain embodiments, the snapshot manager may generate the first snapshot of the first application after loading the first application. The first snapshot may be displayed such that the user may view the first snapshot when browsing the dock. Further, some embodiments may launch the application into the foreground if the user then selects the first snapshot (e.g., by tapping on the snapshot).

At block 525, process 500 can send another request to the memory system for a new memory pressure level. In some embodiments, the other request may be sent a predetermined period of time from when the application has been requested to be loaded. Some embodiments may require the request not to be sent too soon (e.g., not within the predetermined period of time) to ensure the application loading is not interfered, e.g., by any additional application loadings.

At block 530, process 500 can determine that the new memory pressure level is below the threshold value. After loading a first application, some embodiments may proceed to attempt to load another application in the set of applications. If the new memory pressure level after the first application is loaded is still below the threshold value, then a snapshot manager may then determine to load a next application.

At block 535, process 500 can load a second application in the set of applications into the memory system from the persistent storage after determining that the new memory pressure level is below the threshold value. In some embodiments, the second application may be configured to generate a second snapshot of the second application when the second application is loaded into the memory system. In certain embodiments, the snapshot manager may generate the second snapshot of the second application.

Certain embodiments may render the second snapshot such that the user may view the second snapshot when browsing the dock. Further, some embodiments may launch the second application into the foreground if the user then selects the second snapshot (e.g., by tapping on the second snapshot). In some embodiments, the first application and the second application are applications in a remaining subset of applications of the set of applications that had not been loaded into memory. Some embodiments may identify the subset of applications that have not yet been loaded into memory prior to loading the applications.

Figure 6:
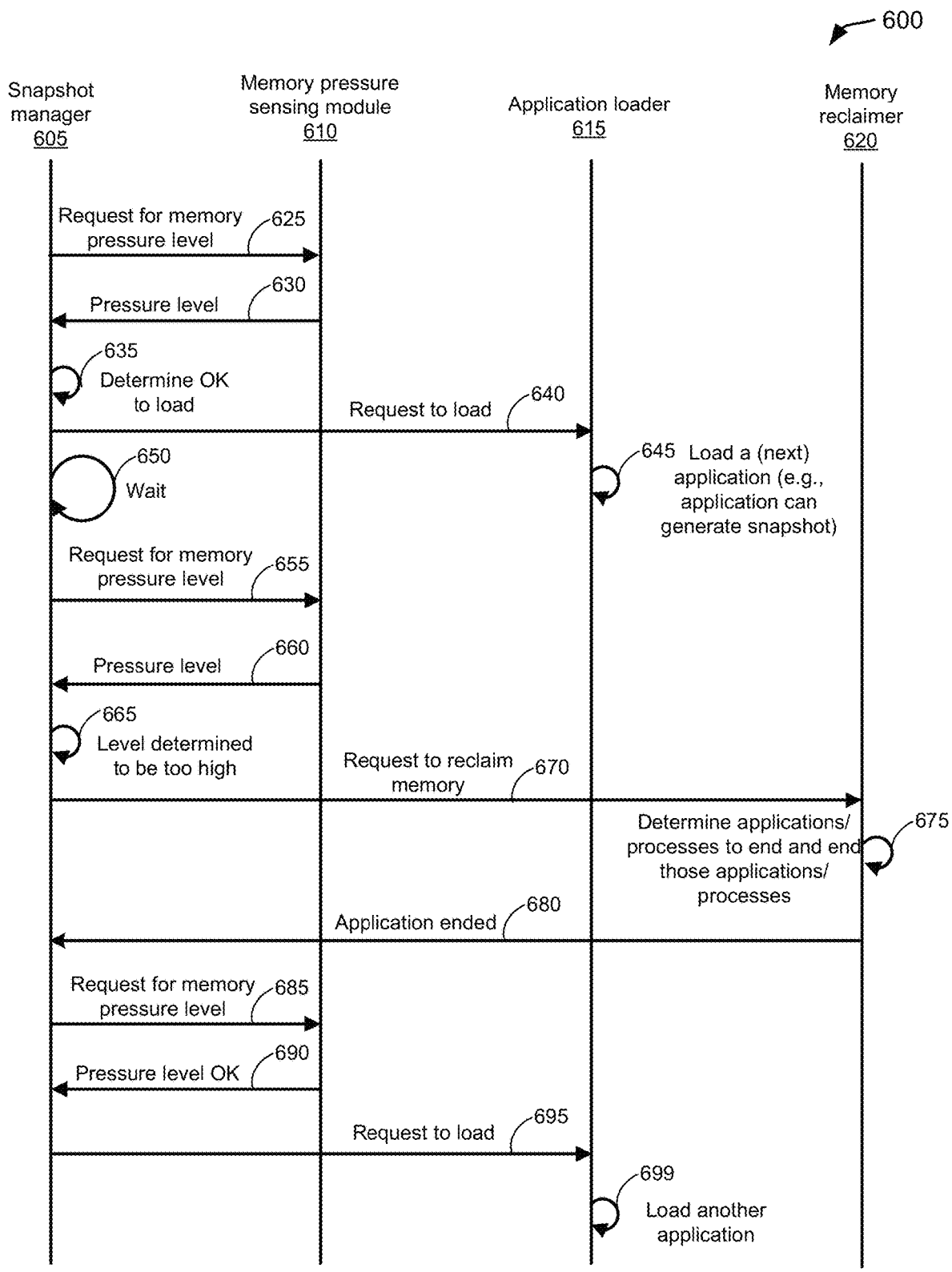
FIG. 6 illustrates an example sequence diagram of reclaiming memory to allow an additional application to be loaded in accordance with certain embodiments.

V. Flow Overview for Reclaiming Memory to Allow Additional Applications to be Loaded A. Reclaiming Memory as Memory Pressure Exceeds a Threshold in Order to Load Another Application FIG. 6 illustrates an example sequence diagram 600 of reclaiming memory to allow an additional application to be loaded in accordance with certain embodiments. As described above, certain embodiments may load additional applications into memory when a memory pressure level is below a threshold. Some embodiments may kill applications from memory when the memory pressure is beyond a threshold (e.g., a same or a different threshold from the threshold used to load additional applications when the memory pressure is below the threshold). Certain embodiments may determine that there are additional applications that need to be loaded into memory such as other applications designated for the dock that are not yet in memory. After determining that additional applications need to be loaded into memory, some embodiments may remove applications and/or processes that have a lower priority level. Certain embodiments may remove an application that has performed a task (e.g., generated an updated snapshot for an application) but does not need to be used for any further purposes within a short period of time. Some embodiments remove the application to free up memory and thereby enable other applications to be loaded.

Sequence diagram 600 illustrates an example of the flow between interacting components including snapshot manager 605, memory pressure sensing module 610, application loader 615, and memory reclaimer 620. Snapshot manager 605 may be similar to snapshot manager 305 from FIG. 3 and may manage the loading of applications and generation of snapshots. Memory pressure sensing module 610 may be similar to memory pressure sensing subsystem 310 from FIG. 3 and may determine a memory pressure of memory on the mobile device by communicating with the memory. Application loader 615 may be similar to application loader 315 from FIG. 3 and may load one or more applications from persistent memory into working memory. Memory reclaimer 620 may be similar to memory reclaimer 320 from FIG. 3 and may de-load one or more applications and/or processes as requested by snapshot manager 605.

At 625, snapshot manager 605 can send a request to memory pressure sensing module 610 for memory pressure level. At 630, responsive to receiving the request for memory pressure level, memory pressure sensing module 610 can determine the memory pressure level and send the determined level to snapshot manager 605. At 635, snapshot manager 605 can determine to load an application based on the received memory pressure level. In some embodiments, snapshot manager 605 may determine to load the application responsive to determining that the memory pressure level is below a certain threshold level. Some embodiments may load more than one application responsive to performing this determination.

At 640, snapshot manager 605 may send a request to application loader 615 to load the application. At 645, application loader 615 may load the application. Some embodiments may load (or also referred to as being pre-launching) the application so that the application can perform one or more tasks in the background such as generating an updated snapshot for the application. At 650, after sending the request to load, snapshot manager 605 may wait for a period of time to permit the application to be loaded. In some embodiments, snapshot manager 605 may wait for a time interval before sending another request for memory pressure level so that snapshot manager 605 does not determine to load another application before the prior application is loaded.

At 655, snapshot manager 605 can send another request to memory pressure sensing module 610 for a current (new) memory pressure level. Memory pressure sensing module 610 may determine the new memory pressure level and send the new memory pressure level to snapshot manager 605 at 660. After receiving the memory pressure level, snapshot manager 605 may determine whether to load another application at 665. At 655, snapshot manager 605 may determine that the memory pressure level is too high (e.g., beyond a threshold value or percentage of the memory's capacity). After determining that the pressure level is beyond a threshold level, at 670, snapshot manager 605 may send a request to memory reclaimer 620 to reclaim memory.

At 675, memory reclaimer 620 can determine which applications and/or processes to end to free up some memory. In some embodiments, the request to reclaim memory sent from snapshot manager 605 may also include a specification as to an amount of memory that needs to be reclaimed. For example, snapshot manager 605 may determine an amount of memory that it needs based on a next application that is slated to be loaded and the amount of memory that the next application requires. In some embodiments, memory reclaimer 620 reclaims a predetermined set amount (e.g., previously set by a system administrator or a user) each time it receives a request to reclaim memory. For example, each time memory reclaimer 620 receives a request to reclaim memory, memory reclaimer 620 may reclaim 20 Gb of memory. Memory reclaimer 620 may identify those applications and/or processes that are on a lower priority level and the amount of memory they would free and end those applications and/or processes.

At 680, memory reclaimer 620 informs snapshot manager 605 that one or more applications and/or processes have been ended, thereby freeing up memory. At 685, snapshot manager 605 may send another request to memory pressure sensing module 610 for the memory pressure level. In certain embodiments, instead of waiting for an indication from memory reclaimer 620 that memory has been freed, snapshot manager 605 may wait for a period of time from sending the request to reclaim memory before sending another request for the new memory pressure level and send the other request.

At 690, snapshot manager 605 can determine that the memory pressure level is now below the threshold level and therefore possible to load another application. After determining that the memory pressure level is below the threshold level at 690, at 695, snapshot manager 605 may request to load a next application. At 699, application loader may then load the next application. Some embodiments may generate a snapshot when a next application is loaded. In some embodiments, the snapshot may be displayed to a user when the user is browsing a preview mode. The user may launch the application into the foreground of the mobile device's interface by selecting the corresponding snapshot (e.g., via a tap on the snapshot).

Figure 7:
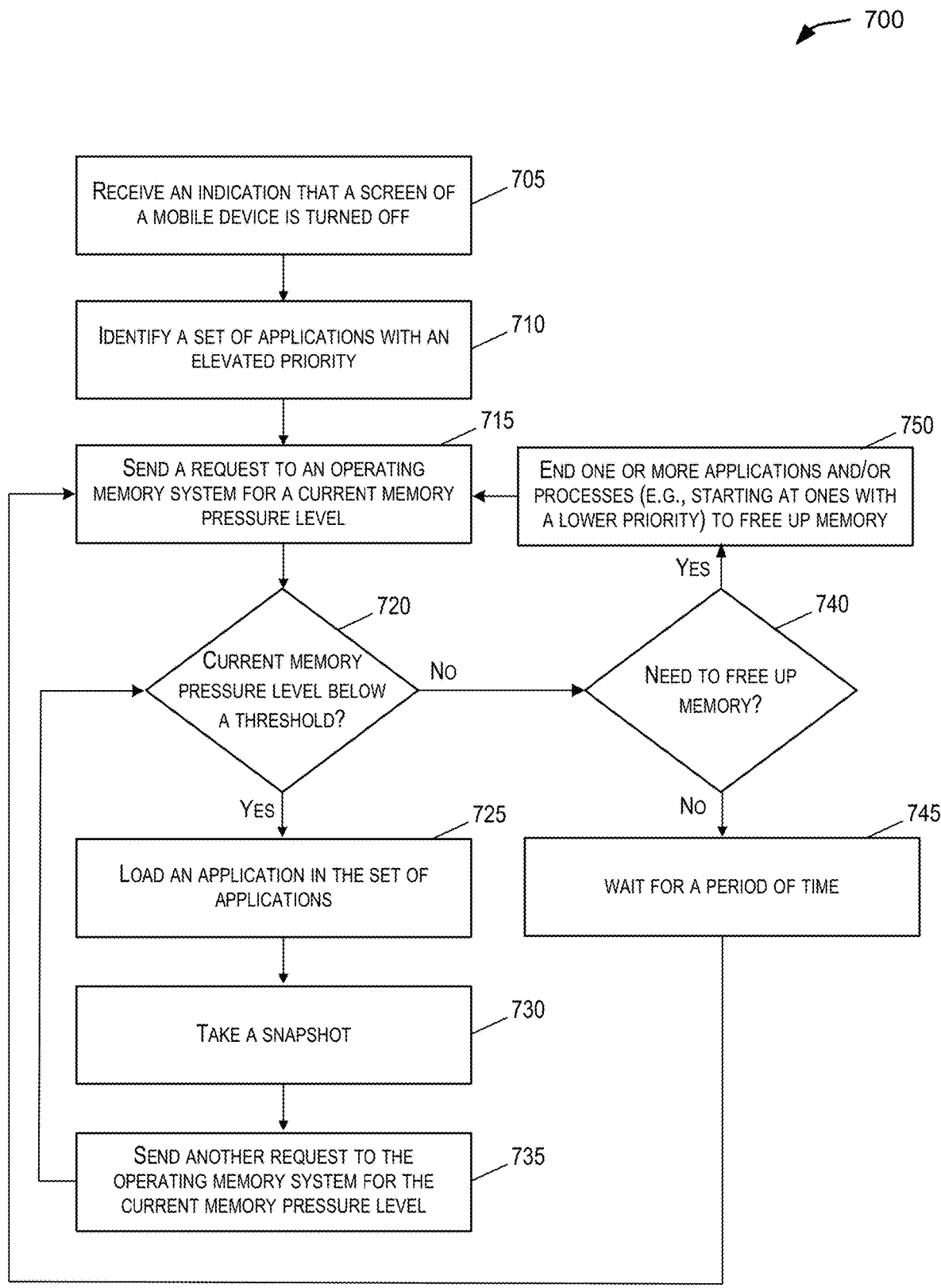
FIG. 7 illustrates an example process for reclaiming memory to enable snapshots for applications in the dock to be updated in accordance with some embodiments.

B. Reclaiming Memory to Enable Application Snapshots for Applications Designated for the Dock to be Updated FIG. 7 illustrates an example process 700 for reclaiming memory to enable snapshots for applications in the dock to be updated in accordance with some embodiments. Some embodiments may reclaim memory so that applications designated for the dock that need their snapshots updated can be updated. Certain embodiments may free up memory for other applications (or processes) that the device may desire to load into memory and allow those applications to be loaded into memory. Some embodiments may determine when memory availability is below a threshold and reclaim memory. After reclaiming memory, certain embodiments may then load another application into memory from persistent storage.

At block 705, process 700 can receive an indication that a screen of a mobile device is turned off. In some embodiments, when the screen of the mobile device is off, additional memory may become available. There is limited user interactivity with the mobile device when the screen is off. Further, since the screen is off, there are no active applications that are launched into the foreground. As such, there may be more memory available to load additional applications and/or processes to perform background processing tasks (e.g., generation of snapshots). Other instances of when additional memory may become available and thus would perform portions of process 700 and other processes described in this disclosure may include when the device's power is being turned on (i.e., on power state), or after determining that the central processing unit has been idle (or performing less than a threshold amount of processing) for over a threshold period of time. Some embodiments may perform and repeat this process every time the screen turns off.

At block 710, process 700 can identify a set of applications with an elevated priority. In some embodiments, the set of applications with an elevated priority may include the applications that are designated for the dock for viewing in a preview mode. In some embodiments, the set of applications may include a number of applications that is less than a total number of applications installed on the mobile device.

At block 715, process 700 can send a request to a memory system for a current memory pressure level. In some embodiments, the request for the current memory pressure level of the working memory can be sent by a snapshot manager (e.g., snapshot manager 305 from FIG. 3) to a memory pressure sensing subsystem (e.g., memory pressure sensing subsystem 310 from FIG. 3). In certain embodiments, the memory pressure sensing system may interact and communicate with the memory and determine what a current memory pressure level is.

At block 720, process 700 can determine whether a current memory pressure level is below a threshold level. At block 725, after determining that the current memory pressure level is below the threshold, process 700 can load an application in the set of applications into working memory from a persistent storage. In some embodiments, the persistent storage can reside on a same mobile device on which the working memory resides. In certain embodiments, the persistent storage can reside on another mobile device (e.g., a smart phone) from the mobile device on which the working memory is residing. Certain embodiments may load multiple applications after determining that the current memory pressure level is below the threshold.

At block 730, process 700 can take a snapshot of the application after the application has been loaded into memory. Some embodiments may retrieve, compile, and assemble application data for the snapshot. In some embodiments, while the application is loading, a spinner may be presented. Certain embodiments may wait for a time period until the spinning is no longer present before taking a snapshot of the assembled application data.

The application may be in an inactive state where it can have CPU time to obtain updated application data for a snapshot, but not active where a user can interact with the application. In some embodiments, the application may generate a snapshot by determining the application data needed for the snapshot. The application may provide the snapshot information to the operating system and allow the system to take a snapshot of the provided snapshot information.

At block 735, process 700 can send another request to the memory system for the current memory pressure level. In some embodiments, a snapshot manager may send another request to a memory pressure sensing subsystem to obtain a new memory pressure level. The request may be sent a period of time after the snapshot manager send the request to load the application into memory.

At 740, after determining that the current memory pressure level is not below the threshold level, process 700 can determine whether there is a need to reclaim memory. Certain embodiments may determine that there is a need to reclaim memory when there are additional applications that are designated for the dock that are not loaded in memory. Some embodiments may determine that there is a need to free up memory after determining that there are application snapshots that are outdated and need to be updated. Certain embodiments may determine that there is a need to reclaim memory if the application that snapshot manager and/or application loader is trying to load exceeds the amount of memory that is still available.

Some embodiments may determine that an application snapshot needs to be updated because the application data in the snapshot is expiring. As described, application snapshots may need to be updated to include recent data for the applications that are designated for the dock. Certain embodiments may determine that there is a need to reclaim memory if there is not enough memory available and can reclaim by unloading applications that do not need their snapshots updated within a short period of time. After unloading those applications, some embodiments may then be able to load the application into memory to generate an updated snapshot for the application. The applications that need their snapshots updated can be loaded into memory and unloaded in a round robin manner where as one application is loaded the application that was loaded at an earliest time is unloaded.

At 745, after determining that there is not a need to free up memory (e.g., there are no other applications that need to be loaded into memory), process 700 can wait for a period of time before returning to block 715 where another request is sent for a new memory pressure level. Some embodiments may cease to load another application into memory after determining that there is no need to free up additional memory in the memory device.

At 750, after determining that there is a need to free up memory, process 700 can end one or more applications and/or processes to free up memory. Some embodiments may end one or more applications and/or processes that have the lowest priority value. Certain embodiments may de-load (also referred to as unload throughout this disclosure) an application that has the lowest priority value. Some embodiments may start de-loading one or more applications and/or processes from memory starting from the ones with the lowest priority value and continuing to those with the second lowest priority value, etc. Certain embodiments may de-load applications starting at ones at a lower priority band (e.g., priority levels 1-3).

After ending one or more applications and/or processes, process can then return to block 715. Again, at block 715, process 700 may send another request to the memory system for a new memory pressure level. Certain embodiments may then load the application if the new memory pressure level is below the threshold.

While some embodiments may de-load a single application or a single process each time it receives a request to free up memory, certain embodiments may determine an amount of memory needed to be free up and free up memory accordingly. Some embodiments may determine the amount of memory taken up by one or more applications and/or processes and determine whether freeing up those applications and/or processes would be sufficient. In certain embodiments, after receiving the request to free up memory, a memory reclaimer may then reclaim a set amount of memory (e.g., 20 Mb) worth of applications and/or processes.

In some embodiments, an application is de-loaded each time process 700 determines that there is a need to free up memory. After de-loading the application, some embodiments may check for memory pressure level again. Certain embodiments may discard an application at a time but continue to discard until a certain amount of memory has been freed. For instance, some embodiments may keep discarding applications until there has been 20 Mb of memory freed from the memory device. After freeing up the amount of memory, some embodiments may then check for the memory pressure level again and allow another application to load if the new memory pressure level is below the threshold.

Figure 8:
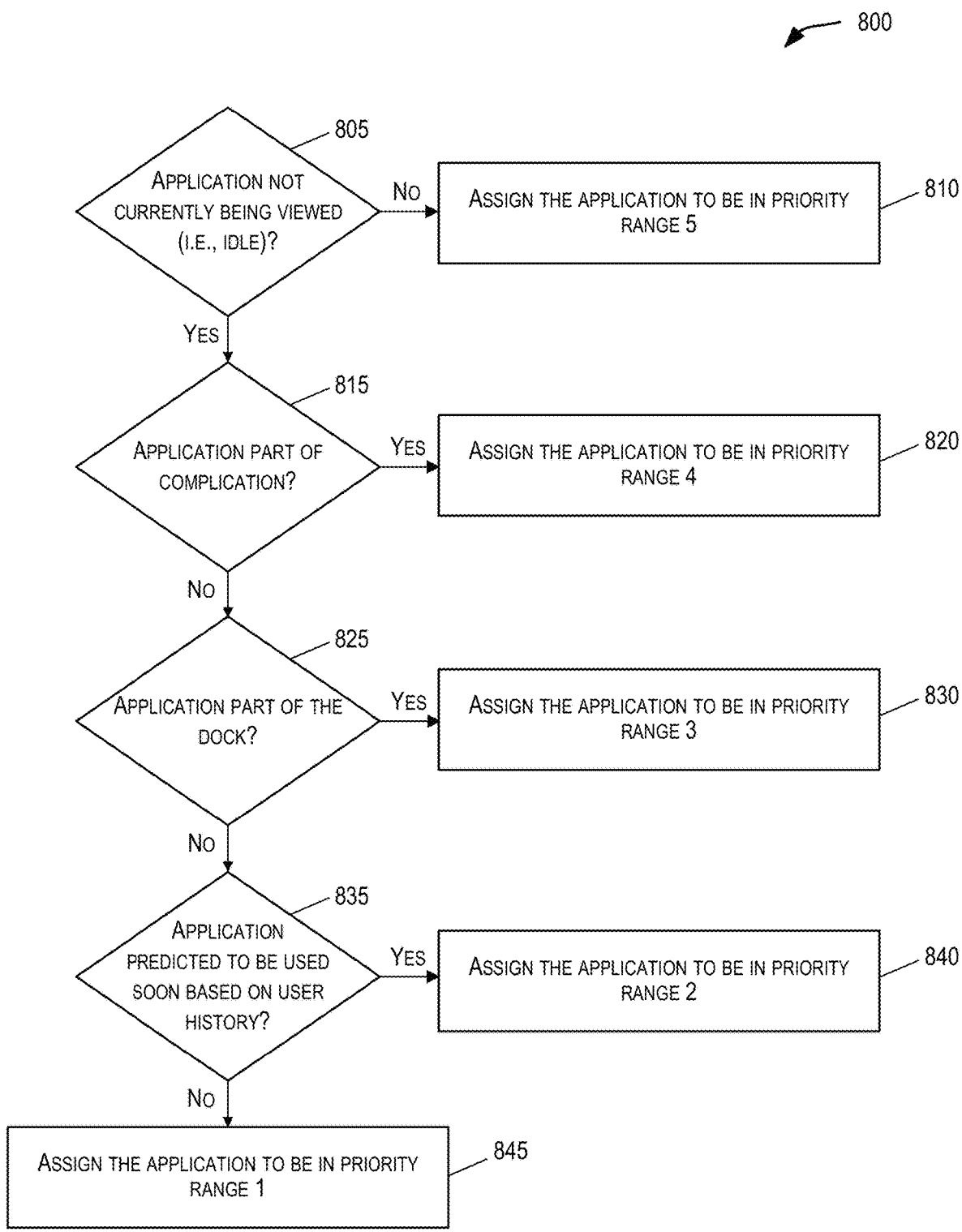
FIG. 8 illustrates an example process for assigning a priority level for an application according to some embodiments.

C. Assigning Applications a Priority Level Such that an Application May be De-Loaded Based on the Priority Level Associated with the Application FIG. 8 illustrates an example process 800 for assigning a priority level for an application according to some embodiments. In some embodiments, each application loaded in working memory can be assigned a priority level. Some embodiments may assign the priority level for an application when the application is loaded into memory. In certain embodiments, as the status of the application changes, the priority level of the application may change. An example of the status of the application changing can be from being launched in the foreground and viewed by a user to becoming idle in the background. Another example of the status of the application change can be from being designated as part of the dock to no longer being designated as part of the dock. A further example of the application status change can be from an application that was not part of complications to an application that has part of its application data displayed on a face of a wearable device.

Some embodiments may reclaim memory based on a priority level of an application and/or process. In some embodiments, a memory reclaimer (e.g., memory reclaimer 320 in FIG. 3) may de-load an application from working memory starting at the application with the lowest priority level. In certain embodiments, the priority level of the application may be assigned using process 800. Different embodiments may assign the priority levels of applications differently.

At block 805, process 800 can determine whether an application is not currently being viewed. In some embodiments, when the application is not currently being viewed, the user is not interacting with the application and the application may be idle (i.e., not active).

At block 810, after determining that the application is currently being viewed, process 800 can assign the application a priority level within a priority range 5 (also referred to as priority band 5). In some embodiments, a priority range of 5 includes one or more high priority levels. As such, when discarding applications, an application with a priority range of 5 may be unlikely to be discarded (until all the applications with a lower priority level have been discarded).

At block 815, process 800 can determine whether the application is part of the complication. In certain embodiments, a "complication" is an item on the face of a mobile device (e.g., on the default display page of the mobile device such as a watch) that does not tell time, such as date, weather, atmospheric pressure, calendar information, etc. A particular complication can correspond to a particular application running on the mobile device. In some embodiments, complication can be designated by a user or by a system administrator. In certain embodiments, complication can be determine by a mobile device when particular application data has been accessed by a user over a threshold frequency, e.g., within a past time period.

At block 820, after determining that the application is part of a complication, process 800 can assign the application to be in priority range 4. Again, the priority range may include multiple priority levels within that priority range. Priority range 4 may be have priority levels that are less important than the priority levels part of priority range 5.

At block 825, after determining that the application is not part of complication, process 800 can determine whether the application is designated for a preview mode, e.g., in a dock. After determining that the application is part of the dock, at block 830, process 800 can assign the application to be in priority range 3.

After determining that the application is not part of the dock, at block 835, process 800 can determine whether the application is predicted to be used soon based on user history. Certain embodiments may determine that an application is predicted to be launched by a user (or to be brought to the foreground to interact with the user) by monitoring user interaction with various applications and tracking those applications that are used on a regular basis. Some embodiments may predict that the user would launch one or more applications at certain times of the day or certain days of the week and assign those applications a higher priority level when the application is predicted to be used within a short period of time (e.g., within the next 10 minutes, within the next hour, within the next day).

After determining that the application is predicted to be used within a certain time interval, at block 840, process 800 can assign the application to be in priority range 2. After determining that the application is not predicted to be used soon, at block 845, process 800 can assign the application to be in priority range 1.

Certain embodiments may start unloading applications from memory beginning with the application with the lowest priority. For instance, a memory reclaimer (e.g., memory reclaimer 320 from FIG. 3) may identify the application with the lowest priority level (such as an application that is in priority range 1—not currently being launched in the foreground, not part of the dock or complication, and not predicted to be used within a recent upcoming time period), and unload the application from memory. As applications within a lowest priority band are discarded, the memory reclaimer may continue to determine the applications with a lower priority level and unload those.

Different embodiments may factor in different considerations in assigning a priority level. For instance, certain embodiments may assign those applications that are taking up too much memory (e.g., more than 20 Mb) a low priority level (e.g., priority level 1). As such, applications that are taking up too much memory may be unloaded from memory before others. Some embodiments may use a complex algorithm in assigning the applications their priority levels. Certain embodiments may factor in multiple parameters (e.g., an application taking up too much memory, an application that is in a dock) when determining how to assign the priority level for the application.

VI. Example Mobile Device

Figure 9:
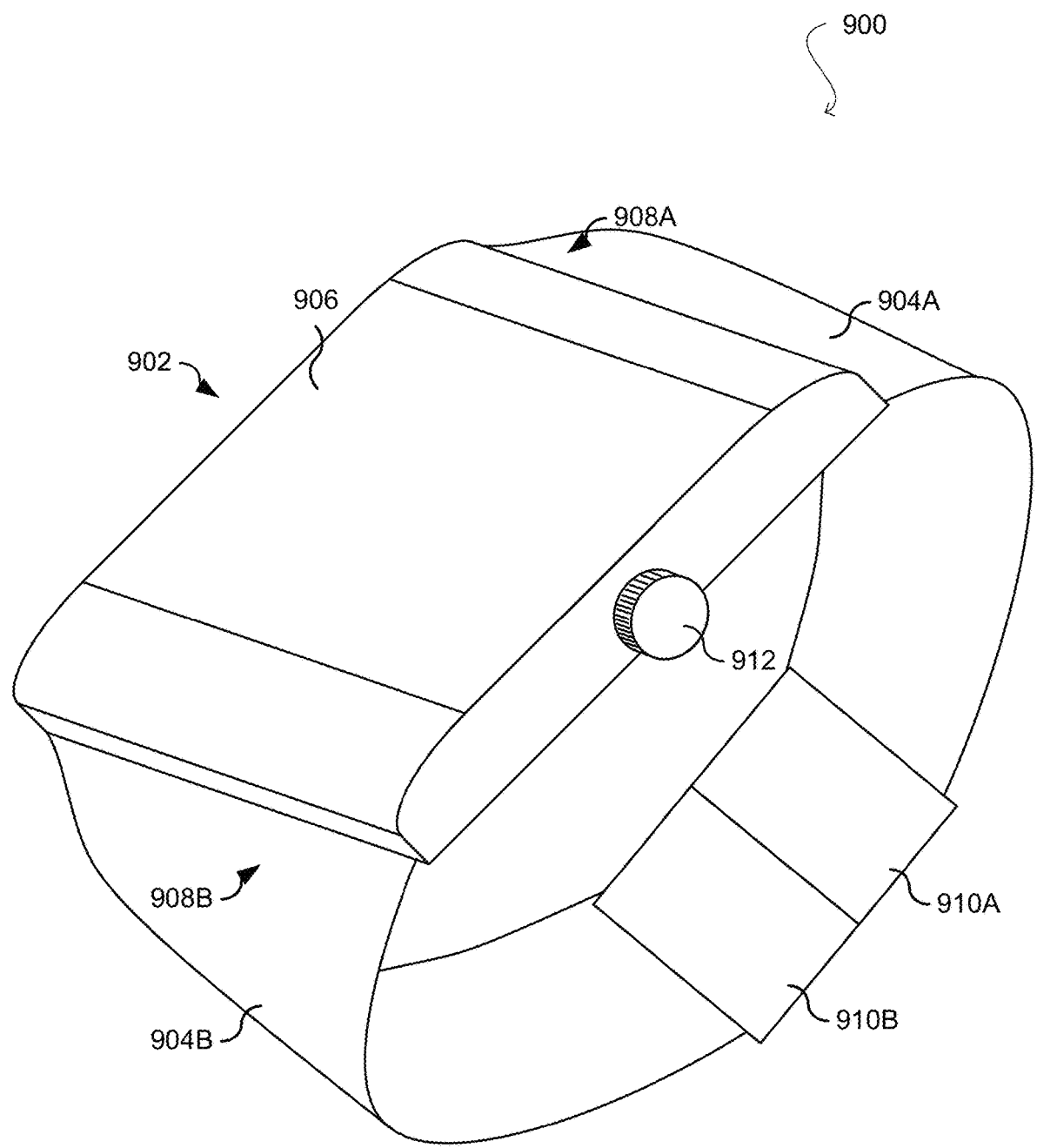
FIG. 9 shows wearable device for loading one or more applications in a dock into working memory from a persistent storage according to some embodiments.

Embodiments described herein may take the form of, be incorporated in, or operate with a suitable electronic device. One example of such a device is shown in FIG. 9 and takes the form of a wearable mechanism (e.g., the mobile device 200 of FIG. 2 or another type of smart device). Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 9 shows wearable device 900 for loading one or more applications in a dock into working memory from a persistent storage according to some embodiments. In this example, wearable device 900 is shown as a wristwatch-like device with a face portion 902 connected to straps 904A, 904B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 902 can include, e.g., a touchscreen display 906 that can be appropriately sized depending on where on a user's person wearable device 900 is intended to be worn. A user can view information presented by wearable device 900 on touchscreen display 906 and provide input to wearable device 900 by touching touchscreen display 906. In some embodiments, touchscreen display 906 can occupy most or all of the front surface of face portion 902.

Straps 904A, 904B can be provided to allow wearable device 900 to be removably worn by a user, e.g., around the user's wrist, and secured thereto. In some embodiments, straps 904A, 904B can be made of any flexible material (e.g., fabrics, flexible plastics, leather, chains or flexibly interleaved plates or links made of metal or other rigid materials) and can be connected to face portion 902, e.g., by hinges. Alternatively, straps 904A, 904B can be made of a rigid material, with one or more hinges positioned at the junction of face portion 902 and proximal ends 908A, 908B of straps 904A, 904B and/or elsewhere along the lengths of straps 904A, 904B to allow a user to put on and take off wearable device 900. Different portions of straps 904A, 904B can be made of different materials; for instance, flexible or expandable sections can alternate with rigid sections. In some embodiments, one or both of straps 904A, 904B can include removable sections, allowing wearable device 900 to be resized to accommodate a particular user's wrist size. In some embodiments, straps 904A, 904B can be portions of a continuous strap member that runs behind or through face portion 902. Face portion 902 can be detachable from straps 904A, 904B; permanently attached to straps 904A, 904B; or integrally formed with straps 904A, 904B.

The distal ends of straps 904A, 904B opposite face portion 902 can provide complementary clasp members 910A, 910B that can be engaged with each other to secure the distal ends of straps 904A, 904B to each other, forming a closed loop. In this manner, wearable device 900 can be secured to a user's person, e.g., around the user's wrist; clasp members 910A, 910B can be subsequently disengaged to facilitate removal of wearable device 900 from the user's person. The design of clasp members 910A, 910B can be varied; in various embodiments, clasp members 910A, 910B can include buckles, magnetic clasps, mechanical clasps, snap closures, etc. In some embodiments, one or both of clasp members 910A, 910B can be movable along at least a portion of the length of corresponding strap 904A, 904B, allowing wearable device 900 to be resized to accommodate a particular user's wrist size.

Straps 904A, 904B can be two distinct segments, or they can be formed as a continuous band of an elastic material (including, e.g., elastic fabrics, expandable metal links, or a combination of elastic and inelastic sections), allowing wearable device 900 to be put on and taken off by stretching a band formed straps 904A, 904B. In such embodiments, clasp members 910A, 910B can be omitted.

Straps 904A, 904B and/or clasp members 910A, 910B can include sensors that allow wearable device 900 to determine whether it is being worn at any given time. Wearable device 900 can operate differently depending on whether it is currently being worn or not. For example, wearable device 900 can inactivate various user interface and/or RF interface components when it is not being worn. In addition, in some embodiments, wearable device 900 can notify a companion device (e.g., a smartphone, a mobile device, a tablet device, a media player, a speaker, or other electronic devices) when a user puts on or takes off wearable device 900.

In various embodiments, wearable device 900 includes a rotary input such as a crown 912 (also referred to as digital crown throughout the specification). Crown 912 can be used to perform a variety of functions. In some embodiments, crown 912 provides rotation input for navigating content (e.g., zooming in and out of content, panning across content). In this example, crown 912 includes a plastic or metal crown body, preferably having conventional outer teeth. Typically, a pedestal made integral with the body of crown 912 is positioned and protrudes into face portion 902. Crown 912 may be fastened, either permanently or removably, to hardware associated with wearable device 900. Rotation of the crown (and/or a stem) may be sensed optically, electrically, magnetically, or mechanically. Further, in some embodiments the crown (and/or stem) may also move laterally, thereby providing a second type of input to the device.

Wearable device 900 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 900 is illustrative and that variations and modifications are possible. For example, wearable device 900 can be implemented in any wearable article, including a watch, a bracelet, a necklace, a ring, a belt, a jacket, or the like. In some instances, wearable device 900 can be a clip-on device or pin-on device that has a clip or pin portion that attaches to the user's clothing. The interface portion (including, e.g., touchscreen display 906) can be attached to the clip or pin portion by a retractable cord, and a user can easily pull touchscreen display 906 into view for use without removing the clip or pin portion, then let go to return wearable device 900 to its resting location. Thus, a user can wear wearable device 900 in any convenient location.

Figure 10:
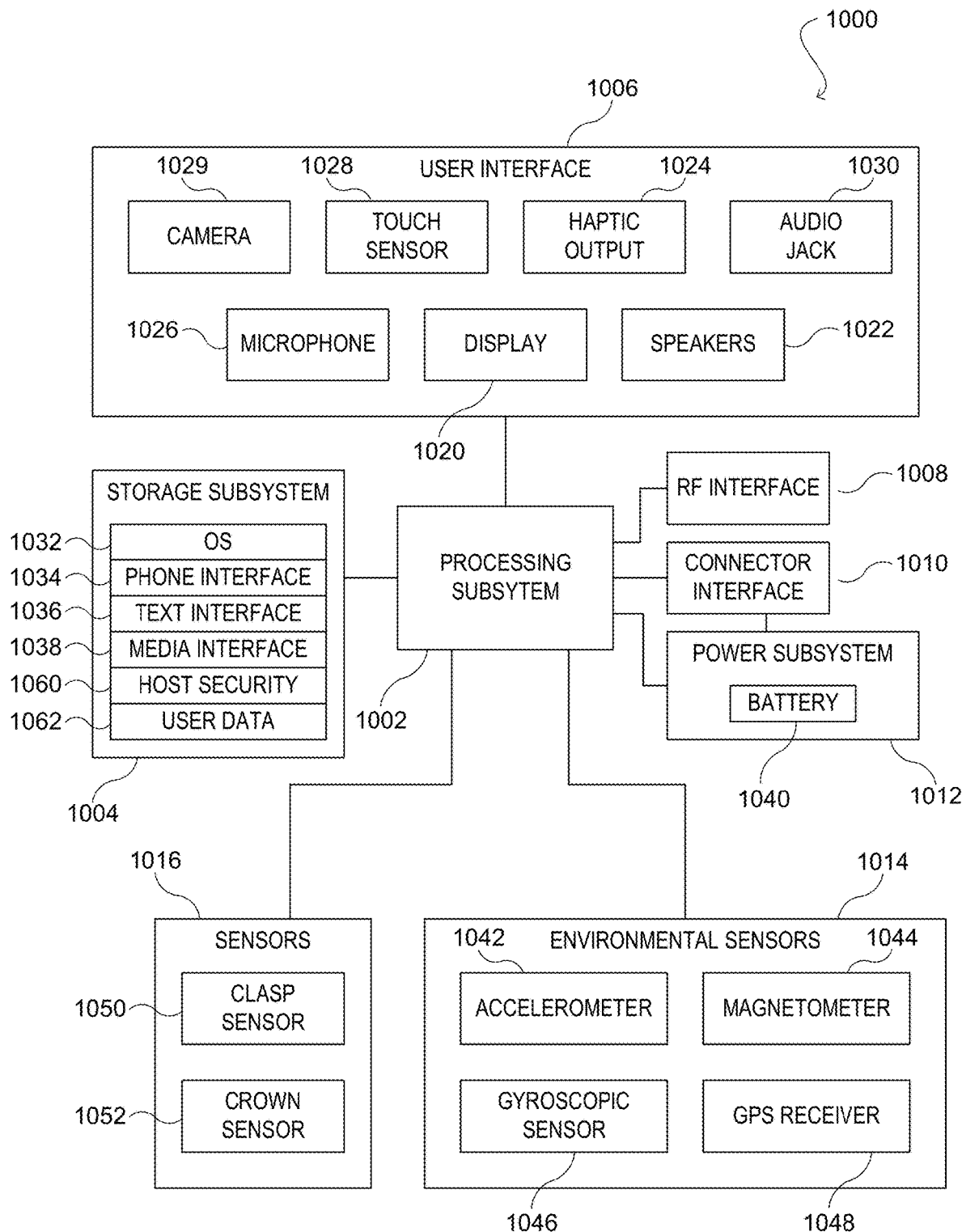
FIG. 10 is a simplified block diagram of the wearable device of FIG. 9 (e.g., implementing wearable device) according to certain embodiments.

Wearable device 900 can be implemented using electronic components disposed within face portion 902, straps 904A, 904B, and/or clasp members 910A, 910B. FIG. 10 is a simplified block diagram of the wearable device of FIG. 9 (e.g., implementing wearable device 900) according to certain embodiments. Wearable device 1000 can include processing subsystem 1002, storage subsystem 1004, user interface 1006, RF interface 1008, connector interface 1010, power subsystem 1012, environmental sensors 1014, and strap sensors 1016. Wearable device 1000 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 1004 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1004 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1004 can also store one or more application programs to be executed by processing subsystem 1002 (e.g., video game programs, personal information management programs, media playback programs, interface programs associated with particular host devices and/or host device functionalities, etc.).

User interface 1006 can include any combination of input and output devices. A user can operate input devices of user interface 1006 to invoke the functionality of wearable device 1000 and can view, hear, and/or otherwise experience output from wearable device 1000 via output devices of user interface 1006.

Examples of output devices include display 1020, speakers 1022, and haptic output generator 1024. Display 1020 can be implemented using compact display technologies, e.g., LCD (liquid crystal display), LED (light-emitting diode), OLED (organic light-emitting diode), or the like. In some embodiments, display 1020 can incorporate a flexible display element or curved-glass display element, allowing wearable device 1000 to conform to a desired shape. One or more speakers 1022 can be provided using small-form-factor speaker technologies, including any technology capable of converting electronic signals into audible sound waves. In some embodiments, speakers 1022 can be used to produce tones (e.g., beeping or ringing) and can but need not be capable of reproducing sounds such as speech or music with any particular degree of fidelity. Haptic output generator 1024 can be, e.g., a device that converts electronic signals into vibrations; in some embodiments, the vibrations can be strong enough to be felt by a user wearing wearable device 1000 but not so strong as to produce distinct sounds.

Wearable device 1000 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 1026, touch sensor 1028, and camera 1029. Microphone 1026 can include any device that converts sound waves into electronic signals. In some embodiments, microphone 1026 can be sufficiently sensitive to provide a representation of specific words spoken by a user; in other embodiments, microphone 1026 can be usable to provide indications of general ambient sound levels without necessarily providing a high-quality electronic representation of specific sounds.

Touch sensor 1028 can include, e.g., a capacitive sensor array with the ability to localize contacts to a particular point or region on the surface of the sensor and in some instances, the ability to distinguish multiple simultaneous contacts. In some embodiments, touch sensor 1028 can be overlaid over display 1020 to provide a touchscreen interface, and processing subsystem 1002 can translate touch events (including taps and/or other gestures made with one or more contacts) into specific user inputs depending on what is currently displayed on display 1020. In some embodiments, touch sensor 1028 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 1029 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 1004 and/or transmitted by wearable device 1000 to other devices for storage. Depending on implementation, the optical components can provide fixed focal distance or variable focal distance; in the latter case, autofocus can be provided. In some embodiments, camera 1029 can be disposed along an edge of face portion 902 of FIG. 9, e.g., the top edge, and oriented to allow a user to capture images of nearby objects in the environment such as a bar code or QR code. In other embodiments, camera 1029 can be disposed on the front surface of face portion 902 of FIG. 9, e.g., to capture images of the user. Zero, one, or more cameras can be provided, depending on implementation.

In some embodiments, user interface 1006 can provide output to and/or receive input from an auxiliary device such as a headset. For example, audio jack 1030 can connect via an audio cable (e.g., a standard 2.5-mm or 3.5-mm audio cable) to an auxiliary device. Audio jack 1030 can include input and/or output paths. Accordingly, audio jack 1030 can provide audio to the auxiliary device and/or receive audio from the auxiliary device. In some embodiments, a wireless connection interface can be used to communicate with an auxiliary device.

Processing subsystem 1002 can be implemented as any electronic device capable of processing, receiving, or transmitting data or instructions. Processing subsystem 1002 can include one or more integrated circuits. For example, processing subsystem 1002 may include one or more of: one or more single-core or multi-core microprocessors or microcontrollers, a central processing unit (CPU), an application-specific integrated circuit (ASIC), a digital signal processor (DSP), or additional or combinations of such devices. In operation, processing subsystem 1002 can control the operation of wearable device 1000. In various embodiments, processing subsystem 1002 can execute a variety of programs in response to program code and can maintain multiple concurrently executing programs or processes. At any given time, some or all of the program code to be executed can be resident in processing subsystem 1002 and/or in storage media such as storage subsystem 1004.

Through suitable programming, processing subsystem 1002 can provide various functionality for wearable device 1000. For example, in some embodiments, processing subsystem 1002 can execute an operating system (OS) 1032 and various applications for interfacing with a host device, such as a phone-interface application 1034, a text-interface application 1036, and/or a media interface application 1038. In some embodiments, some or all of these application programs can interact with a host device, e.g., by generating messages to be sent to the host device and/or by receiving and interpreting messages from the host device. In some embodiments, some or all of the application programs can operate locally to wearable device 1000. For example, if wearable device 1000 has a local media library stored in storage subsystem 1004, media interface application 1038 can provide a user interface to select and play locally stored media items. Examples of interface applications are described below.

In some embodiments, processing subsystem 1002 can also execute a host security process 1060 that provides support for establishing and maintaining a verified communication session with a host device. A verified communication session can provide an enhanced level of security, and various operations of wearable device 1000 and/or a host device can be made conditional on whether a verified communication session between the devices is in progress. For instance, host security process 1060 can facilitate unlocking a host device when wearable device 1000 is present, depending on whether a verified session is in progress. User data 1062 can include any information specific to a user, such as identification information, user-specified settings and preferences, customized information (e.g., contacts, predefined text messages), and any other user-related data or content. In some embodiments, executing applications and processes can access user data 1062 to facilitate operations.

RF (radio frequency) interface 1008 can allow wearable device 1000 to communicate wirelessly with various host devices. RF interface 1008 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 1008 can be implemented using a combination of hardware (e.g., driver circuits, antennas, modulators/demodulators, encoders/decoders, and other analog and/or digital signal processing circuits) and software components. In some embodiments, RF interface 1008 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1008. Wearable device 1000 may wirelessly communicate with a sales terminal nearby, thus permitting a user to quickly and efficiently conduct a transaction such as selling, buying, or returning a good. Wearable device 1000 may use NFC technology to perform these and other functions.

Connector interface 1010 can allow wearable device 1000 to communicate with various host devices via a wired communication path, e.g., using Universal Serial Bus (USB), universal asynchronous receiver/transmitter (UART), or other protocols for wired data communication. In some embodiments, connector interface 1010 can provide a power port, allowing wearable device 1000 to receive power, e.g., to charge an internal battery. For example, connector interface 1010 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 1010 and/or RF interface 1008 can be used to support synchronization operations in which data is transferred from a host device to wearable device 1000 (or vice versa). For example, as described below, a user can customize certain information for wearable device 1000 (e.g., a "favorite" contacts list and/or specific predefined text messages that can be sent). While user interface 1006 can support data-entry operations, a user may find it more convenient to define customized information on a separate device (e.g., a tablet or smartphone) that has a larger interface (e.g., including a real or virtual alphanumeric keyboard), then transfer the customized information to wearable device 1000 via a synchronization operation. Synchronization operations can also be used to load and/or update other types of data in storage subsystem 1004, such as media items, application programs, and/or operating system programs. Synchronization operations can be performed in response to an explicit user request and/or automatically, e.g., when wearable device 1000 resumes communication with a particular host device or in response to either device receiving an update to its copy of synchronized information.

Environmental sensors 1014 can include various electronic, mechanical, electromechanical, optical, or other devices that provide information related to external conditions around wearable device 1000. Sensors 1014 in some embodiments can provide digital signals to processing subsystem 1002, e.g., on a streaming basis or in response to polling by processing subsystem 1002 as desired. Any type and combination of environmental sensors can be used; shown by way of example are accelerometer 1042, a magnetometer 1044, a gyroscope sensor 1046, and a GPS receiver 1048.

Some environmental sensors can provide information about the location and/or motion of wearable device 1000. For example, accelerometer 1042 can sense acceleration (relative to freefall) along one or more axes, e.g., using piezoelectric or other components in conjunction with associated electronics to produce a signal. Magnetometer 1044 can sense an ambient magnetic field (e.g., Earth's magnetic field) and generate a corresponding electrical signal, which can be interpreted as a compass direction. Gyroscope sensor 1046 can sense rotational motion in one or more directions, e.g., using one or more MEMS (micro-electro-mechanical systems) gyroscopes and related control and sensing circuitry. Global Positioning System (GPS) receiver 1048 can determine location based on signals received from GPS satellites.

Other sensors can also be included in addition to or instead of these examples. For example, a sound sensor can incorporate microphone 1026 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 1000 may modify a brightness of a display in response to the sensed ambient light. As another example, wearable device 1000 may turn the display off if little or no light is sensed for a period of time.

Sensors 1016 can include various electronic, mechanical, electromechanical, optical, or other devices that provide information to wearable device 1000. For instance, clasp sensor 1050 can be at least partially disposed within either or both of clasp members 910A, 910B of FIG. 9 and can detect when clasp members 910A, 910B are engaged with each other or disengaged from each other. For example, engaging clasp members 910A, 910B to each other can complete an electrical circuit, allowing current to flow through clasp sensor 1050; disengaging clasp members 910A, 910B from each other can break the circuit. As another example, one or more crown sensors 1052 can be disposed to detect input from crown 912 of FIG. 9. Crown sensors 1052 can also include motion sensors, accelerometers, pressure sensors (e.g., piezoelectric devices), or the like.

Any other type of sensor can be used in addition to or instead of strap sensors 1016 and crown sensors 1052. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 1000.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 1000 may include a force sensor (not shown here) to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 1012 can provide power and power management capabilities for wearable device 1000. For example, power subsystem 1012 can include a battery 1040 (e.g., a rechargeable battery) and associated circuitry to distribute power from battery 1040 to other components of wearable device 1000 that require electrical power. In some embodiments, power subsystem 1012 can also include circuitry operable to charge battery 1040, e.g., when connector interface 1010 is connected to a power source. In some embodiments, power subsystem 1012 can include a "wireless" charger, such as an inductive charger, to charge battery 1040 without relying on connector interface 1010. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1012 can also include other power sources, such as a solar cell, in addition to or instead of battery 1040.

In some embodiments, power subsystem 1012 can control power distribution to components within wearable device 1000 to manage power consumption efficiently. For example, power subsystem 1012 can automatically place wearable device 1000 into a "hibernation" state when strap sensors 1016 indicate that wearable device 1000 is not being worn. The hibernation state can be designed to reduce power consumption; accordingly, user interface 1006 (or components thereof), RF interface 1008, connector interface 1010, and/or environmental sensors 1014 can be powered down (e.g., to a low-power state or turned off entirely), while strap sensors 1016 are powered up (either continuously or at intervals) to detect when a user puts on wearable device 1000. As another example, in some embodiments, while wearable device 1000 is being worn, power subsystem 1012 can turn display 1020 and/or other components on or off depending on motion and/or orientation of wearable device 1000 detected by environmental sensors 1014. For instance, if wearable device 1000 is designed to be worn on a user's wrist, power subsystem 1012 can detect raising and rolling of a user's wrist, as is typically associated with looking at a wristwatch, based on information provided by accelerometer 1042. In response to this detected motion, power subsystem 1012 can automatically turn display 1020 and/or touch sensor 1028 on; similarly, power subsystem 1012 can automatically turn display 1020 and/or touch sensor 1028 off in response to detecting that user's wrist has returned to a neutral position (e.g., hanging down).

Power subsystem 1012 can also provide other power management capabilities, such as regulating power consumption of other components of wearable device 1000 based on the source and amount of available power, monitoring stored power in battery 1040, generating user alerts if the stored power drops below a minimum level, and so on.

In some embodiments, control functions of power subsystem 1012 can be implemented using programmable or controllable circuits operating in response to control signals generated by processing subsystem 1002 in response to program code executing thereon, or as a separate microprocessor or microcontroller.

It will be appreciated that wearable device 1000 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising performing, by one or more processors of a mobile device having a memory system:
    storing a predetermined list of applications that are designated for providing snapshots to be displayed when the mobile device is in a preview mode;
    sending a request to the memory system for a current memory pressure level, the memory system communicably coupled with the one or more processors such that applications in the memory system are configured to be executed by the one or more processors;
    in response to determining that the current memory pressure level is below a threshold:
        (a) loading a first application in the predetermined list of applications into the memory system from a persistent storage;
        (b) retrieving updated application data from the first application, when the first application is loaded into the memory system but is not launched; and
        (c) generating a snapshot of the first application, using a background processing task, the snapshot including the updated application data retrieved from the first application and configured to be displayed on a screen of the mobile device when the mobile device is in the preview mode; and
    in response to determining that the current memory pressure level is not below a threshold:
        unloading the first application from the memory system of the mobile device to reclaim an amount of memory used by the first application;
        at a later time, loading a second application into the memory system from the persistent storage;
        retrieving updated application data from the second application, when the second application is loaded into the memory system but is not launched;
        generating a snapshot of the second application, using a background processing task, the snapshot including the updated application data retrieved from the second application and configured to be displayed on the screen of the mobile device when the mobile device is in the preview mode; and
        responsive to generating the snapshot including the updated application data retrieved from the second application, unloading the second application from the memory system of the mobile device.

2. The method of claim 1 further comprising:
    responsive to determining that the current memory pressure level is greater than the threshold, not loading another application into the memory system from the persistent storage.

3. The method of claim 1 further comprising:
    receiving an indication that a screen of the mobile device is no longer displaying a graphical user interface, wherein the predetermined list of applications are identified subsequent to receiving the indication.

4. The method of claim 1 further comprising:
    responsive to determining that a screen of the mobile device is no longer displaying a graphical user interface, determining that a third application in the predetermined list of applications has already been loaded; and
    determining a remaining subset of applications in the predetermined list of applications that have not yet been loaded, wherein the first application is in the remaining subset of applications.

5. A mobile device comprising:
    one or more processors; and
    a computer readable medium coupled to the one or more processors, wherein the computer readable medium is encoded with a set of instructions which when executed causes the one or more processors to perform:
        storing a predetermined list of applications that are designated for providing snapshots to be displayed when the mobile device is in a preview mode;
        sending a request to a memory system of the mobile device for a current memory pressure level, the memory system communicably coupled with the one or more processors such that applications in the memory system are configured to be executed by the one or more processors;
        in response to determining that the current memory pressure level is below a threshold:
            (a) loading a first application in the predetermined list of applications into the memory system from a persistent storage;
            (b) retrieving updated application data from the first application, when the first application is loaded into the memory system but is not launched; and
            (c) generating a snapshot of the first application, using a background processing task, the snapshot including the updated application data retrieved from the first application and configured to be displayed on a screen of the mobile device when the mobile device is in the preview mode; and
        in response to determining that the current memory pressure level is not below a threshold:
            unloading the first application from the memory system of the mobile device to reclaim an amount of memory used by the first application;
            at a later time, loading a second application into the memory system from the persistent storage;
            loading the second application into the memory system from the persistent storage;
            retrieving updated application data from the second application, when the second application is loaded into the memory system but is not launched;
            generating a snapshot of the second application, using a background processing task, the snapshot including the updated application data retrieved from the second application and configured to be displayed on the screen of the mobile device when the mobile device is in the preview mode; and responsive to generating the snapshot including the updated application data retrieved from the second application, unloading the second application from the memory system of the mobile device.

6. The mobile device of claim 5 wherein the one or more processors are further caused to perform:
responsive to determining that the current memory pressure level is greater than the threshold, not loading another application into the memory system from the persistent storage.

7. The mobile device of claim 5 wherein the one or more processors are further caused to perform:
receiving an indication that a screen of the mobile device is no longer displaying a graphical user interface, wherein the predetermined list of applications are identified subsequent to receiving the indication.

8. The mobile device of claim 5 wherein the one or more processors are further caused to perform:
responsive to determining that a screen of the mobile device is no longer displaying a graphical user interface, determining that a third application in the predetermined list of applications has already been loaded; and
determining a remaining subset of applications in the predetermined list of applications that have not yet been loaded, wherein the first application is in the remaining subset of applications.

9. A computer product comprising a non-transitory computer readable medium storing a plurality of instructions that when executed cause one or more processors of a mobile device to perform:
storing a predetermined list of applications that are designated for providing snapshots to be displayed when the mobile device is in a preview mode;
sending a request to a memory system of the mobile device for a current memory pressure level, the memory system communicably coupled with the one or more processors such that applications in the memory system are configured to be executed by the one or more processors;
in response to determining that the current memory pressure level is below a threshold:
(a) loading a first application in the predetermined list of applications into the memory system from a persistent storage;
(b) retrieving updated application data from the first application, when the first application is loaded into the memory system but is not launched; and
(c) generating a snapshot of the first application, using a background processing task, the snapshot including the updated application data retrieved from the first application and configured to be displayed on a screen of the mobile device when the mobile device is in the preview mode; and
in response to determining that the current memory pressure level is not below a threshold:
unloading the first application from the memory system of the mobile device to reclaim an amount of memory used by the first application;
at a later time, loading a second application into the memory system from the persistent storage;
retrieving updated application data from the second application, when the second application is loaded into the memory system but is not launched;
generating a snapshot of the second application, using a background processing task, the snapshot including the updated application data retrieved from the second application and configured to be displayed on the screen of the mobile device when the mobile device is in the preview mode; and
responsive to generating the snapshot including the updated application data retrieved from the second application, unloading the second application from the memory system of the mobile device.

10. The computer product of claim 9 wherein the instructions further comprise:
responsive to determining that the current memory pressure level is greater than the threshold, not loading another application into the memory system from the persistent storage.

11. The computer product of claim 9 wherein the instructions further comprise:
receiving an indication that a screen of the mobile device is no longer displaying a graphical user interface, wherein the predetermined list of applications are identified subsequent to receiving the indication.

12. The method of claim 1 further comprising:
sending a second request to the memory system for an updated current memory pressure level; and
in response to determining that the updated current memory pressure level is below the threshold:
(a) loading a second application in the predetermined list of applications into the memory system from the persistent storage;
(b) retrieving updated application data from the second application, when the second application is loaded into the memory system but is not launched; and
(c) generating a second snapshot of the second application, using a background processing task, including the updated application data retrieved from the second application.

13. The mobile device of claim 8, wherein the computer readable medium is encoded with further instructions which when executed causes the one or more processors to perform:
sending a second request to the memory system for an updated current memory pressure level; and
in response to determining that the updated current memory pressure level is below the threshold:
(a) loading a second application in the predetermined list of applications into the memory system from the persistent storage;
(b) retrieving updated application data from the second application, when the second application is loaded into the memory system but is not launched; and
(c) generating a second snapshot of the second application, using a background processing task, including the updated application data retrieved from the second application.

14. The computer product of claim 9 wherein the instructions further comprise:
sending a second request to the memory system for an updated current memory pressure level; and
in response to determining that the updated current memory pressure level is below the threshold:
(a) loading a second application in the predetermined list of applications into the memory system from the persistent storage;
(b) retrieving updated application data from the second application, when the second application is loaded into the memory system but is not launched; and (c) generating a second snapshot of the second application, using a background processing task, including the updated application data retrieved from the second application.

15. The method of claim 1, further comprising:

responsive to generating the snapshot of the first application including the updated application data retrieved from the first application, unloading the first application from the memory system of the mobile device.

16. The mobile device of claim 5, wherein the computer readable medium is encoded with further instructions which when executed causes the one or more processors to perform:

responsive to generating the snapshot of the first application including the updated application data retrieved from the first application, unloading the first application from the memory system of the mobile device.

17. The computer product of claim 9, wherein the instructions further comprise:

responsive to generating the snapshot of the first application including the updated application data retrieved from the first application, unloading the first application from the memory system of the mobile device.

\* \* \* \* \*